US012341266B2

(12) United States Patent
Hu et al.

(10) Patent No.: US 12,341,266 B2
(45) Date of Patent: Jun. 24, 2025

(54) LOW-SAR ANTENNA AND ELECTRONIC DEVICE

(71) Applicant: Honor Device Co., Ltd., Shenzhen (CN)

(72) Inventors: Yiwu Hu, Shenzhen (CN); Aofang Zhang, Shenzhen (CN); Kunpeng Wei, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 17/908,153

(22) PCT Filed: Mar. 30, 2022

(86) PCT No.: PCT/CN2022/084112
§ 371 (c)(1),
(2) Date: Aug. 30, 2022

(87) PCT Pub. No.: WO2022/267600
PCT Pub. Date: Dec. 29, 2022

(65) Prior Publication Data

US 2024/0128646 A1 Apr. 18, 2024

(30) Foreign Application Priority Data

Jun. 25, 2021 (CN) ......................... 202110711505.9

(51) Int. Cl.
*H01Q 1/48* (2006.01)
*H01Q 1/24* (2006.01)
*H01Q 9/04* (2006.01)

(52) U.S. Cl.
CPC ........... *H01Q 9/0421* (2013.01); *H01Q 1/243* (2013.01); *H01Q 1/48* (2013.01)

(58) Field of Classification Search
None
See application file for complete search history.

(56) References Cited

U.S. PATENT DOCUMENTS

| | | | |
|---|---|---|---|
| 5,936,587 | A | 8/1999 | Gudilev et al. |
| 9,439,151 | B2 | 9/2016 | Zhu et al. |

(Continued)

FOREIGN PATENT DOCUMENTS

| | | | |
|---|---|---|---|
| CN | 201146239 | Y | 11/2008 |
| CN | 105811103 | A | 7/2016 |
| CN | 107959106 | A | 4/2018 |
| CN | 108666741 | A | 10/2018 |

(Continued)

OTHER PUBLICATIONS

Panchenko, B.A., et al., "Microstrip antennas," Moscow: Radio i svyaz' [Radio and Communication], 1986, 144 pages, with partial translation.

*Primary Examiner* — Dameon E Levi
*Assistant Examiner* — Anh N Ho
(74) *Attorney, Agent, or Firm* — Conley Rose, P.C.

(57) ABSTRACT

An antenna includes a first radiation structure having a first radiator, and a second radiation structure having a second radiator. A first end of the first radiator and a first end of the second radiator form a first gap. A second end of the first radiator is free, and a second end of the second radiator is grounded. A feed point of the antenna is coupled to the first radiator, and the first radiator is divided into a first portion and a second portion that are delimited by the feed point. In a case that the antenna is in operation, the first portion of the first radiator and the second radiator work together in a first frequency band and a second frequency band, and a frequency of the first frequency band is less than a frequency of the second frequency band.

20 Claims, 24 Drawing Sheets

(56) References Cited

U.S. PATENT DOCUMENTS

| | | | | |
|---|---|---|---|---|
| 10,015,294 | B2 | 7/2018 | Lee et al. | |
| 10,644,381 | B2 * | 5/2020 | Ye | H01Q 5/385 |
| 10,998,610 | B2 | 5/2021 | Nie et al. | |
| 2013/0088404 | A1 | 4/2013 | Ramachandran et al. | |
| 2015/0109182 | A1 | 4/2015 | Chen et al. | |
| 2016/0365623 | A1 | 12/2016 | Kim et al. | |
| 2017/0048363 | A1 | 2/2017 | Lee et al. | |
| 2017/0310012 | A1 | 10/2017 | Wong et al. | |
| 2018/0069301 | A1 * | 3/2018 | Choi | H01Q 9/42 |
| 2019/0372195 | A1 * | 12/2019 | Nie | H01Q 5/371 |
| 2020/0343637 | A1 | 10/2020 | Qu | |
| 2022/0140471 | A1 * | 5/2022 | Sun | H01Q 5/328<br>343/702 |
| 2022/0209403 | A1 | 6/2022 | Li et al. | |
| 2023/0318180 | A1 * | 10/2023 | Lan | H01Q 1/243<br>343/702 |
| 2023/0344152 | A1 * | 10/2023 | Wu | H01Q 5/35 |
| 2023/0352852 | A1 * | 11/2023 | Wu | H01Q 1/241 |
| 2023/0361467 | A1 * | 11/2023 | Wu | H01Q 5/40 |
| 2024/0072418 | A1 * | 2/2024 | Wu | H04B 1/0064 |

FOREIGN PATENT DOCUMENTS

| | | | |
|---|---|---|---|
| CN | 108808221 | A | 11/2018 |
| CN | 108832263 | A | 11/2018 |
| CN | 109149114 | A | 1/2019 |
| CN | 109390693 | A | 2/2019 |
| CN | 109659693 | A | 4/2019 |
| CN | 111244616 | A | 6/2020 |
| CN | 211350950 | U | 8/2020 |
| CN | 211350957 | U | 8/2020 |
| CN | 112310605 | A | 2/2021 |
| CN | 112615136 | A | 4/2021 |
| CN | 112787077 | A | 5/2021 |
| CN | 112928456 | A | 6/2021 |
| CN | 113013593 | A | 6/2021 |
| CN | 113013594 | A | 6/2021 |
| CN | 113594697 | A | 11/2021 |
| EP | 1798808 | A1 | 6/2007 |
| EP | 3131156 | B1 | 3/2019 |
| RU | 2178604 | C2 | 1/2002 |
| WO | 2013166777 | A1 | 11/2013 |
| WO | 2020221075 | A1 | 11/2020 |
| WO | WO-2022247378 | A1 * | 12/2022 |

* cited by examiner (a)

(b)

(a)

(b)

(a) (b)

LOW-SAR ANTENNA AND ELECTRONIC DEVICE

CROSS-REFERENCE TO RELATED APPLICATIONS

This application is a U.S. National Stage of International Application No. PCT/CN2022/084112 filed on Mar. 30, 2022, which claims priority to Chinese Patent Application No. 202110711505.9, filed with the China National Intellectual Property Administration on Jun. 25, 2021, both of which are incorporated herein by reference in their entireties.

TECHNICAL FIELD

This application relates to the field of electronic devices, and in particular, to a low-SAR antenna and an electronic device.

BACKGROUND

An electronic device may send and receive wireless signals through an antenna disposed therein. The radiation performance of the antenna is closely related to the environment of the antenna in the electronic device. For example, in a case that an antenna is disposed at a lower portion of an electronic device, the antenna will be covered when a user holds the electronic device, which greatly affects the radiation performance of the antenna, thereby affecting the communication experience of the user while holding the electronic device.

At present, an antenna may be disposed at an upper portion of an electronic device, so as to avoid the influence of holding the electronic device on the radiation performance of the antenna.

It is to be understood that, in addition to providing a user with a smooth wireless communication experience, the electronic device in operation also needs to control the radiation to human body within a proper range, so as to avoid electromagnetic radiation damage to human body. When the antenna is disposed at an upper portion of the electronic device, the antenna is relatively close to the head of the user in some scenarios where the user uses the electronic device (for example, when the user makes a call by using a mobile phone). However, an antenna with good radiation performance generally generates or receives electromagnetic waves with large power, thereby generating large radiation to the head of the user.

Therefore, how to control the radiation to human body within a proper range while ensuring the radiation capability of the electronic device becomes a key to ensuring the wireless communication performance of the electronic device.

SUMMARY

Embodiments of this application provide a low-SAR antenna and an electronic device, which can provide good radiation performance at middle/high frequencies and have a low SAR value.

To achieve the foregoing objective, the following technical solutions are used in the embodiments of this application.

According to a first aspect, a low-SAR antenna is provided, applicable to an electronic device. The antenna includes: a first radiation structure and a second radiation structure. The first radiation structure includes a first radiator, the second radiation structure includes a second radiator, and the first radiator and the second radiator are not in communication with each other. A first end of the first radiator and a first end of the second radiator are provided opposite to each other, and the first end of the first radiator and the first end of the second radiator form a first gap. A second end of the first radiator is free, and a second end of the second radiator is grounded. A feed point of the antenna is coupled to the first radiator, the first radiator is divided into a first portion and a second portion that are delimited by the feed point, and a length of the first portion is less than a length of the second portion. A ground point is provided on the second portion, that is, between the second end of the first radiator and the feed point.

Based on this solution, a specific solution example of a high-performance low-SAR antenna is provided. In this example, the antenna may include two radiation regions such as a first radiation structure and a second radiation structure. Each radiation structure may include a corresponding radiator and a related ground and/or feed structure. In this solution provided by this example, the first radiation structure may be used as an object of direct feeding, that is, feed signals may be directly fed into a first radiator through a feed point, so as to excite the working of the first radiator. For example, a working frequency band of the first radiator may include a low frequency. In some implementations, low-frequency coverage may be implemented by exciting ¼ wavelength on the first radiator. In some other implementations, middle/high frequency coverage may be implemented by exciting a higher-order mode on the first radiator. The second radiation structure may be used as a parasitic structure of the first radiation structure. In this example, the parasitic structure may be provided near a short stub of the first radiator. It is to be noted that, in this solution of this example, the short stub of the first radiator (for example, a first portion of the first radiator) may excite middle/high frequency coverage together with the second radiator. Because the mode covering middle/high frequencies is not a higher-order mode (for example, a higher-order mode of an IFA antenna), the antenna has a low SAR value in middle/high frequency bands. In addition, this solution in this example provides a design of combining the low frequency and the middle/high frequency, so no additional insertion loss caused by splitting the low frequency and the middle/high frequency will not be introduced.

In a possible design, in a case that the antenna is in operation, the first portion of the first radiator and the second radiator work together in a first frequency band and a second frequency band, and a frequency of the first frequency band is less than a frequency of the second frequency band; in a case of working in the first frequency band, a current direction of the first portion is the same as a current direction of the second radiator; and in a case of working in the second frequency band, the current direction of the first portion is opposite to the current direction of the second radiator at the first gap; so that an SAR value of the antenna in the first frequency band and the second frequency band is less than an SAR value of the first radiation structure working alone in the first frequency band and the second frequency band. Based on this solution, a specific mechanism of the antenna in operation provided in this example. For example, the first radiator and the second radiator may excite a CM mode and a DM mode together to replace the higher-order mode of the IFA antenna to cover middle/high frequencies, so that an excessively high SAR value introduced by the higher-order mode is avoided while providing good radiation performance.

In a possible design, the first radiation structure is an IFA antenna. Based on this solution, a specific implementation of the first radiation structure is provided. In this example, the first radiation structure may include a radiation form of an IFA antenna. That is, the first radiation structure may include a first radiator and may also include a feed point and a ground point near the feed point. In some implementations, the first radiation structure may also include a matching circuit between the feed point and a radio frequency module. The matching circuit can reduce the insertion loss at an antenna port by connecting capacitors or inductors in series and/or in parallel. In this example, a small capacitor (for example, less than 2 pF) may be connected in series in the matching circuit of the IFA antenna to excite a left-hand mode on the IFA antenna to cover a low-frequency end. In some implementations, a ground point of the IFA antenna may be in a form of grounding the first radiator through a switch circuit. In this case, low-frequency resonant switching can be achieved by switching the inductance and/or capacitance values of the switch circuit.

In a possible design, the second radiation structure forms a parasitic structure of the first radiator, and in a case that the antenna is in operation, the second radiation structure is electrically coupled to the first radiator of the first radiation structure through the first gap to excite a current on the second radiator. Based on this solution, a specific example of the second radiation structure is provided. In this example, the second radiation structure may be a parasitic structure of the first radiation structure. In some implementations, the second radiation structure may be provided near a short stub of the first radiator. Therefore, the parasitic effect of the second radiation structure can help broaden the frequency band of resonance corresponding to the short stub of the first radiator. In this example, the second radiation structure may not include a feed point to ensure a single-feed structure of the antenna. When the antenna is in operation, the current on the second radiation structure may be excited by electrically coupling to the first radiation structure.

In a possible design, in a case that the antenna is in operation, a slot common mode slot CM mode is excited on the first portion of the first radiator and the second radiator to cover the first frequency band, and a slot differential mode slot DM mode is excited on the first portion of the first radiator and the second radiator to cover the second frequency band. Based on this solution, a specific example of middle/high frequency coverage by the antenna provided in the embodiments of this application is provided. In this example, the CM mode and the DM mode can be excited through the joint action of the first portion (for example, the short stub) of the first radiator and the second radiator, to obtain at least two resonance coverages in the middle/high frequencies. Therefore, a low SAR value can be obtained while providing sufficient bandwidth to cover the middle/high frequencies to ensure the radiation performance.

In a possible design, the feed point coupled to the first radiator is located at a bend of the first radiator. For example, the feed point coupled to the first radiator may be located in an upper right corner of a back view of the electronic device. Based on this solution, a specific example of a position of the feed point of the first radiator provided. The feed point is the first radiator is the feed point of the antenna. The feed point is provided in an upper right corner of an electronic device (for example, a mobile phone), which can more effectively excite a ground current, thereby achieving the effects of broadening the antenna bandwidth and improving the radiation performance. In some implementations of this example, a long stub (for example, the second portion) of the first radiator may be disposed along a side of the mobile phone, and a short stub (for example, the first portion) thereof may be disposed along a top of the mobile phone.

In a possible design, a working frequency band of the second portion of the first radiator covers a third frequency band, and a frequency of the third frequency band is less than the frequency of the second frequency band; and in a case that the antenna works in the third frequency band, currents are distributed in the same direction on the first radiator, and the first radiator covers the third frequency band by exciting a left-hand mode. Based on this solution, a solution example of low-frequency coverage by the antenna provided in the embodiments of this application is provided. In this example, the first radiator may implement low frequency coverage through the long stub (for example, the second portion). In this design, a first coverage may be implemented by exciting a left-right mode of currents in the same direction on the first radiator. As a possible implementation, a small capacitor (for example, less than 2 pF) may be connected in series in a matching circuit to excite a left-hand mode. It is to be noted that, in some other implementations of this application, low-frequency coverage may be implemented by exciting a low-frequency ¼ IFA mode. In this implementation, the ¼ IFA mode may be implemented by exciting currents in the same direction on the second portion.

In a possible design, the antenna further includes a third radiation structure, the third radiation structure includes a third radiator, the third radiator is not in communication with the first radiator and the second radiator respectively, and a first end of the third radiator and the second end of the first radiator are provided opposite to each other; and the first end of the third radiator and the second end of the first radiator form a second gap, and a ground point is provided on the third radiator. Based on this solution, another composition example of a low-SAR antenna is provided. In this example, the third radiation structure may also be disposed at an end of the short stub (for example, the second portion) of the first radiation structure. The third radiation structure can achieve excitation between the middle frequency and the high frequency, thereby further improving the radiation performance of the antenna at middle/high frequencies. Especially, the radiation performance of transitional frequency bands between the middle frequency and the high frequency can be significantly improved.

In a possible design, in a case that the antenna is in operation, the third radiation structure forms a parasitic structure of the first radiator, and the third radiator is configured to be electrically coupled to the first radiator through the second gap to excite a current on the third radiator. Based on this solution, a specific implementation example of the third radiation structure is provided. In this example, the third radiation structure may form a parasitic structure. In some implementations, a size of the third radiator of the third radiation structure may correspond to ¼ wavelength of the frequency band of the resonance of the middle/high frequencies to be covered. Therefore, based on the parasitic effect, the third radiation structure can be electrically coupled through the second gap, so as to excite a parasitic current on the third radiator, thereby achieving the ¼ wavelength excitation and further improving the middle/high frequency performance.

In a possible design, a working frequency band of the third radiator covers a fourth frequency band, and a frequency of the fourth frequency band is between the frequency of the first frequency band and the frequency of the second frequency band. Based on this solution, a specific design example of the third radiation structure is provided. In some implementations, the CM mode and the DM mode are incompatible, so the radiation performance will deteriorate in the vicinity of the frequency band where the CM mode and the DM mode intersect. With the parasitic structure shown in this example, the resonance to be covered can be tuned between the CM mode and the DM mode to compensate the foregoing performance deterioration, so that the antenna has better radiation performance at middle/high frequencies. For example, the fourth frequency band may include a frequency band in the range of 2300-2700 MHz, which can be switched between the CM mode and the DM mode. For example, in some implementations, the fourth frequency band may cover the frequency band around 2.5 GHz.

According to a second aspect, an electronic device is provided. The electronic device includes at least one processor, a radio frequency module, and the low-SAR antenna according to the first aspect and any possible design of the first aspect. In a case that the electronic device sends or receives signals, the signals are sent or received through the radio frequency module and the low-SAR antenna.

It is to be understood that the technical features of the technical solution provided in the second aspect above can all correspond to the low-SAR antenna provided in the first aspect and any possible design of the first aspect, so the similar beneficial effects can be achieved. Details are not described herein again.

DESCRIPTION OF EMBODIMENTS

Generally, an electronic device may be provided with a plurality of antennas for wireless communication in different frequency bands.

For example, the plurality of antennas in the electronic device may include an antenna (for example, referred to as a main antenna) for main frequency (covering 700 MHz or 3 GHz) communication. In an example, the electronic device is a mobile phone. When a main antenna is disposed at a lower portion of the mobile phone, the antenna will be covered by a hand of a user holding the mobile phone, resulting in performance deterioration of the antenna.

In some designs, the main antenna may be disposed at an upper portion of the electronic device, so as to avoid the influence of the user holding the electronic device on the radiation performance of the antenna.

Figure 1:
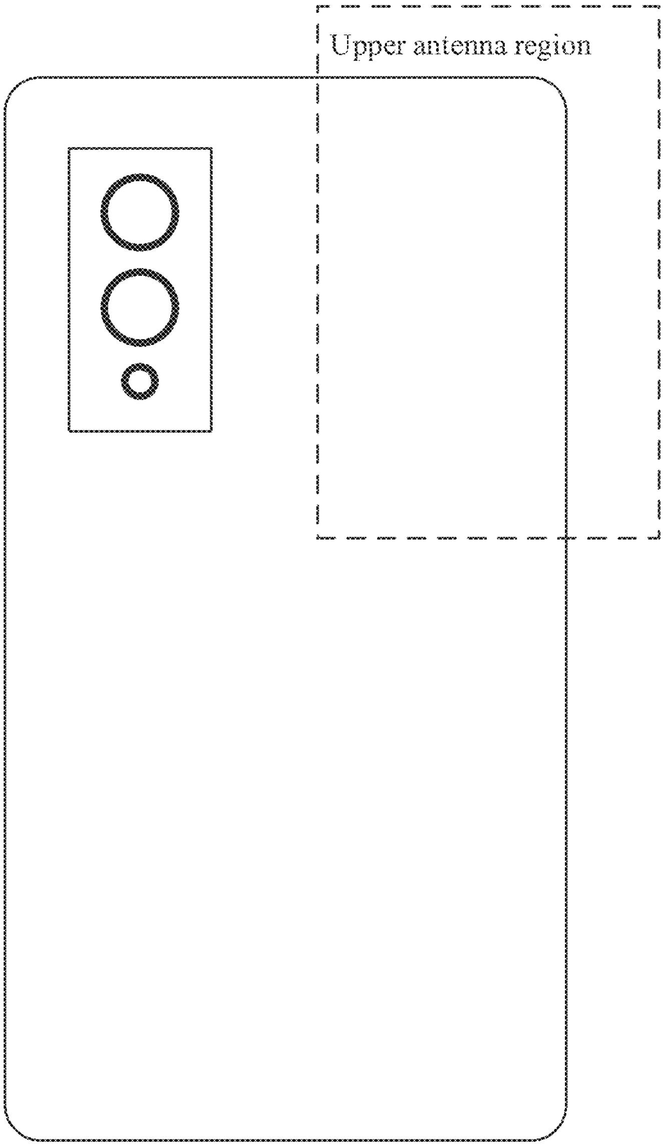
FIG. 1 is a schematic diagram of an antenna arrangement region.

For example, FIG. 1 is a schematic diagram of antenna arrangement in an electronic device. In an example, the electronic device is a mobile phone. FIG. 1 is a back view of the mobile phone. As shown in FIG. 1, a main antenna may be disposed at an upper antenna region. In this case, when a user uses the mobile phone, the hand holding the mobile phone will not cover the main antenna, so that the radiation performance of the main antenna will not be significantly affected.

Figure 2:
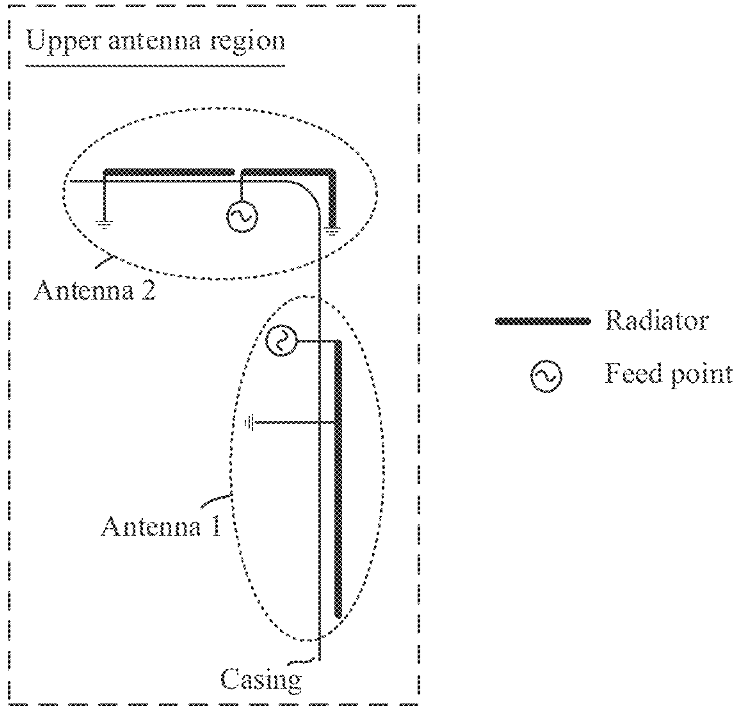
FIG. 2 is a schematic diagram of a distributed antenna.
Figure 3:
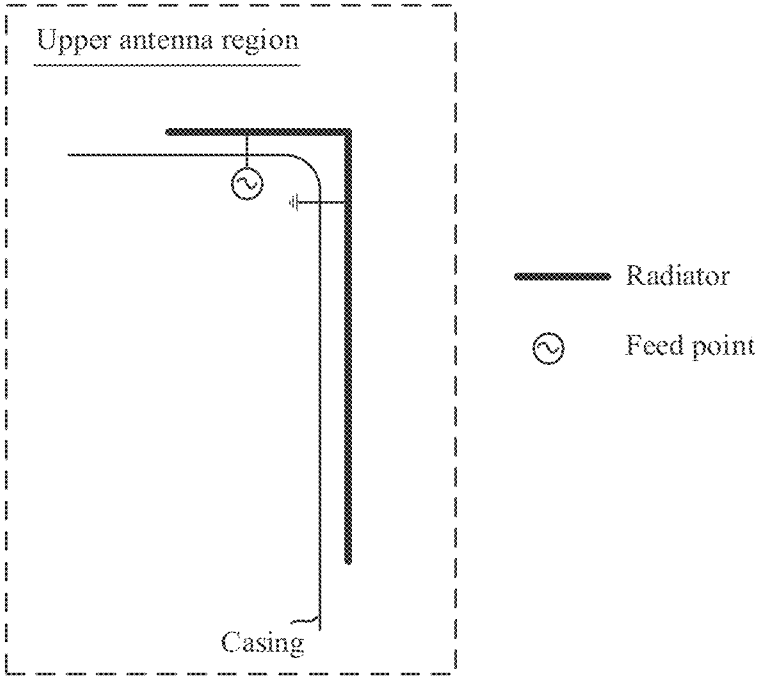
FIG. 3 is a schematic diagram of a typical IFA antenna.

FIG. 2 and FIG. 3 show some examples of a main antenna in an upper antenna region. In the example of FIG. 2, a main antenna may include an antenna 1 and an antenna 2. The antenna 1 may be used for low frequency band (low frequency band, LB) radiation. LB may cover a frequency band from 700 MHz to 9%0 MHz. In the example of FIG. 2, the antenna 1 may be an IFA antenna. For example, a feed point may be coupled to an end of a radiator, and a ground point may be provided to be coupled to the radiator at a position close to the feed point, so as to achieve the radiation form of the IFA antenna. In some implementations, a length of the radiator of the IFA antenna may be close to ¼ wavelength of LB, so that the radiation of the LB frequency band can be excited through the feed point, thereby enabling the antenna 1 to work in the LB frequency band.

In the example of FIG. 2, the antenna 2 may include a structure of a loop antenna (loop antenna) plus parasitic, so as to achieve the radiation of a middle/high frequency band (middle/high frequency band, MHB). The frequency band covered by the middle/high frequency band may include 1710-2690 MHz. The loop antenna may include a feed point-radiator-ground point structure. One end of the parasitic radiator may be close to the loop antenna, and the other end may be grounded. Therefore, the parasitic radiator can obtain energy from the loop antenna through spatial coupling, thereby achieving the radiation function of the antenna 2 together with the loop antenna.

It can be seen from the antenna solution shown in FIG. 2 that low-frequency excitation can be performed on the antenna 1 (that is, a low-frequency signal is inputted to the feed point of the antenna 1) to achieve low-frequency radiation. In a receiving scenario, the antenna 1 may also receive low-frequency electromagnetic waves in space, convert them into currents, and transmit them from the feed point to a radio frequency/hardware module (not shown in FIG. 2). Similarly, the antenna 2 can also achieve middle/high frequency radiation. Therefore, the radiation performance covering the main frequency is achieved.

However, the antenna solution shown in FIG. 2 adopts the form of splitting of low frequency and middle/high frequency. In this way, additional components need to be introduced in a radio frequency front end compared to the unsplit form. It is to be understood that all components on a communication link will introduce loss (that is, an insertion loss) to signals. Therefore, in the solution shown in FIG. 2, at least one level of switch insertion loss will be introduced in the radio frequency front end, so that a full-band radio frequency conduction loss is about 0.5-1 dB, which causes the loss of energy obtained by the antenna during radiation (for example, loss of 0.5-1 dB), and also reduces the radiation performance of the antenna. In addition, after the low frequency and the middle/high frequency are split, the radiator of the antenna also needs to be split. This will inevitably make the space in the already crowded upper antenna region tighter, thereby limiting the size of the radiator of the middle/high frequency (or low frequency), which will lead to reduction of the bandwidth of the high frequency (or low frequency) and reduction of the radiation capability.

Compared with the solution of splitting of low frequency and middle/high frequency shown in FIG. 2, FIG. 3 shows an antenna solution without splitting of low frequency and middle/high frequency. Since there is no need to split low frequency and middle/high frequency at the radio frequency front end, no additional insertion loss will be incurred, thereby improving the antenna performance at a conduction side.

In the solution shown in FIG. 3, the radiation of the main antenna can be achieved in the form of IFA in the upper antenna region. The low frequency can be covered by a ¼ wavelength mode of the IFA antenna, the middle frequency can be covered by a ½ wavelength mode of the IFA antenna, and the high frequency can be covered by a ¾ wavelength or 1 wavelength mode of the IFA antenna.

The antenna with the composition shown in FIG. 3 can cover low frequency and middle/high frequency at the same time, so it can avoid the reduction of antenna radiation performance caused by the splitting of middle/high frequency.

It is to be noted that, it is also necessary to avoid damage to human body due to antenna radiation during the use of the electronic device. In some implementations, the antenna radiation to the human body may be identified by a specific absorption rate (Specific Absorption Rate, SAR) of the antenna. For the same antenna, due to different radiation performance of different frequency bands, the SAR of different frequency bands is also different. The detection of SAR may include head SAR, which is used to identify the radiation of the antenna to the head of a user during the radiation. The detection of SAR may also include body (body) SAR, which is used to identify the radiation of the antenna to the body of the user during the radiation. At present, different operators or market supervision departments have put forward mandatory requirements for SAR to control the radiation of an electronic device to users during use. For example, the Federal Communications Commission (Federal Communications Commission, FCC) requires that the SAR of the relevant frequency band (mainly the middle/high frequency band) cannot exceed 1.6 W/Kg (1 g value).

In the antenna solution shown in FIG. 3, the radiation of middle/high frequency is a higher order mode of the antenna. This will cause most of the current of middle/high frequency to concentrate near the radiator of the antenna during the radiation, leading to the exceeding of SAR.

The radiation of the fundamental mode (for example, ¼ wavelength) and the higher-order mode (for example, ¾ wavelength) shown in FIG. 3 will be described below with reference to FIG. 4 and FIG. 5.

Figure 4:
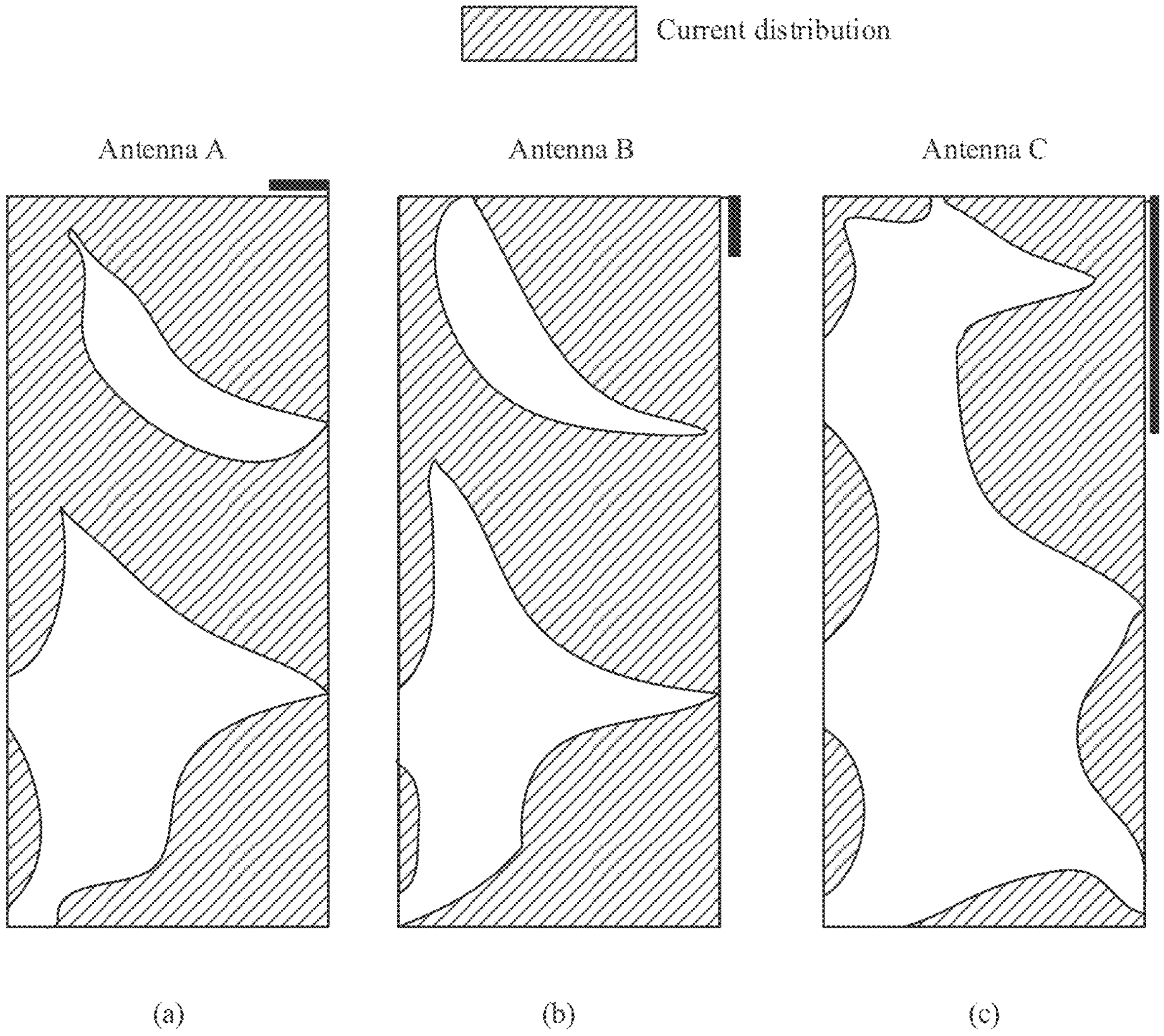
FIG. 4 is a schematic diagram of comparison of current distribution on the ground with different modes.

For example, FIG. 4 shows the current distribution on the ground during radiation with different modes. (a), (b), and (c) in FIG. 4 all work in the same frequency band. As shown in (a) of FIG. 4, a size of the antenna A may be ¼ wavelength of the working frequency band, and the antenna A may be disposed on a top of the electronic device. As shown in (b) of FIG. 4, a size of the antenna B may be ¼ wavelength of the working frequency band, and the antenna B may be disposed at a position of a side of the electronic device close to the top. As shown in (c) of FIG. 4, a size of the antenna C may be ¾ wavelength of the working frequency band, and the antenna C may be disposed at a position of the side of the electronic device close to the top.

Comparing (a), (b), and (c) in FIG. 4, it can be seen that the current distribution on the ground when the antenna A and the antenna B are in operation is more uniform than the current distribution on the ground when the antenna C is in operation. That is, when the antenna A and the antenna B are in operation, a region with weak current on the ground is smaller, and when the antenna C is in operation, a region with weak current on the ground is larger. In other words, the current distribution of the higher-order mode of ¾ wavelength is more concentrated during radiation than that of the fundamental mode (for example, ¼ wavelength), that is, the SAR is higher.

Figure 5:
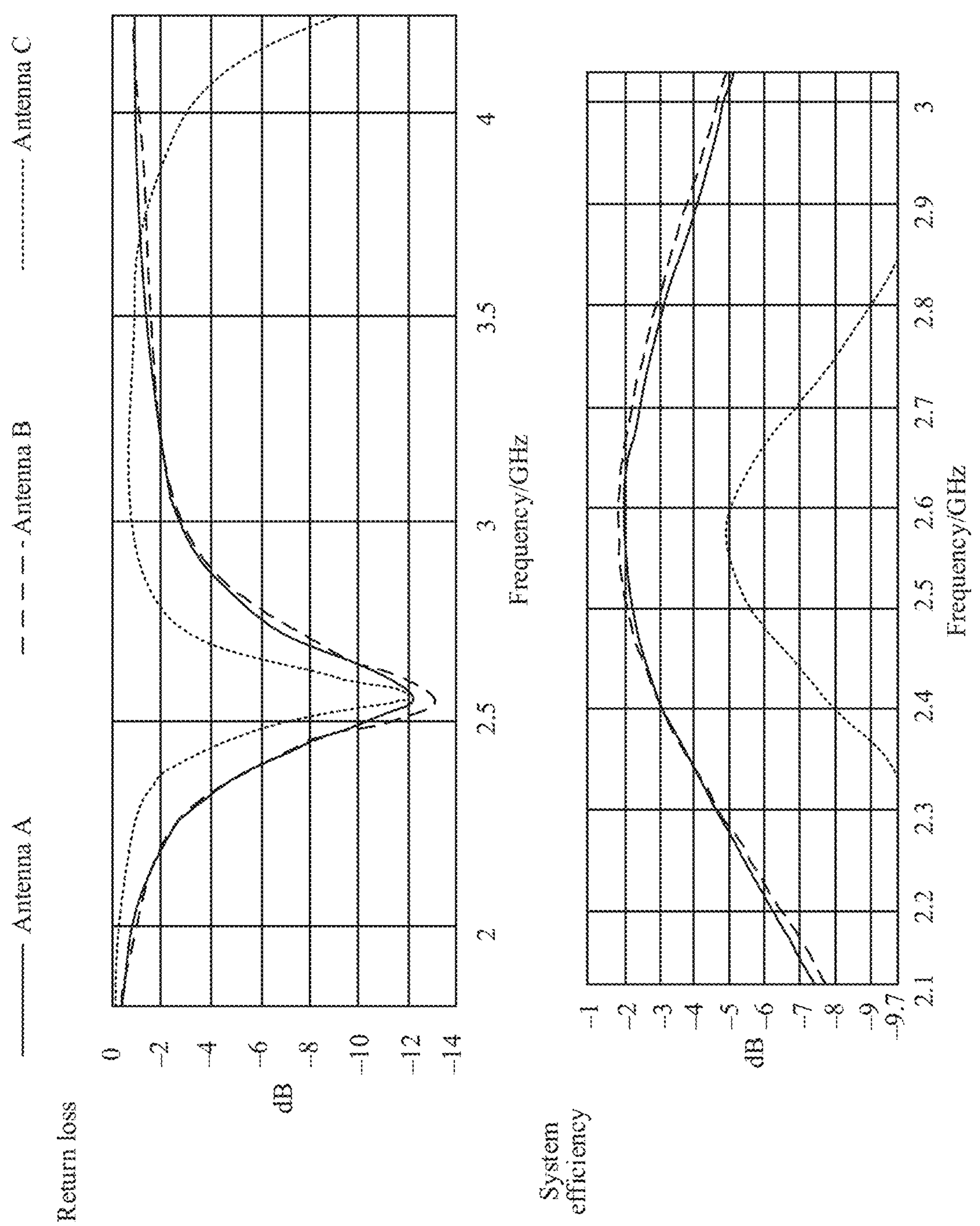
FIG. 5 is a schematic diagram of S-parameters of excitation with different modes.

FIG. 5 shows the radiation performance of the antenna A, the antenna B, and the antenna C. A return loss (S11) can be used to identify the radiation capability of a single port of the antenna. Generally, smaller S11 indicates a greater return loss of the frequency point in a single-port test process, that is, the antenna can have better efficiency at this frequency point. It can be seen that the bandwidth and S11 of the antenna A and the antenna B are better than those of the antenna C. That is, the radiation performance of the fundamental mode is better than that of the higher-order mode.

FIG. 5 also shows the comparison of system efficiency of the antenna A, the antenna B, and the antenna C. It can be seen that, similar to S11, the antenna A and the antenna B have better system efficiency (for example, larger bandwidth and higher efficiency). In contrast, the higher-order mode (that is, the antenna C) has poor system efficiency, manifesting as narrower bandwidth and lower efficiency.

It can be seen from the examples in FIG. 4 and FIG. 5 that the radiation performance of the fundamental mode is better than that of the higher-order mode. In addition, it can be seen from the analysis of the current distribution on the ground that the SAR of the fundamental mode is also less than the SAR of the higher-order mode. For example, Table 1 shows the comparison of the SAR test results of the antenna A, the antenna B, and the antenna C at the same frequency point (such as 2.5 GHz, 2.55 GHz, or 2.6 GHz) in the same test environment (for example, a back surface, CE 5 mm, 10 g, input power 24 dBm, body SAR).

TABLE 1

| Body SAR | Antenna A | Antenna B | Antenna C |
|---|---|---|---|
| 2.5 GHz | 0.61 | 0.63 | 2.59 |
| 2.55 GHz | 0.62 | 0.63 | 2.33 |
| 2.6 GHz | 0.63 | 0.64 | 2.31 |

As shown in Table 1, in the same test environment at 2.5 GHz, the SAR of the antenna A is 0.61, the SAR of the antenna B is 0.63, and the SAR of the antenna C is 2.59. In the same test environment at 2.55 GHz, the SAR of the antenna A is 0.62, the SAR of the antenna B is 0.63, and the SAR of the antenna C is 2.33. In the same test environment at 2.6 GHz, the SAR of the antenna A is 0.63, the SAR of the antenna B is 0.64, and the SAR of the antenna C is 2.31.

It indicates that the SAR of the higher-order mode is significantly higher than that of the fundamental mode.

However, with reference to the description in FIG. 3, although the IFA antenna can achieve the coverage of the main frequency in the upper antenna region, because the middle/high frequency is the higher-order mode radiation, compared with the fundamental mode radiation, if the same or similar radiation performance is to be achieved, there are higher requirements for space. This is obviously not suitable for the limited environment where the upper antenna region is already small. In addition, when the radiation performance of the higher-order mode is improved, the SAR will be significantly increased, making it difficult to control the amount of radiation to the human body.

It is to be understood that, in an example, the electronic device is a mobile phone. Table 1 above shows the comparison of different modes in a body SAR test. Similarly, in a head (head) SAR test, the SAR value of the higher-order mode is also higher than that of the fundamental mode. However, since the IFA antenna is disposed in the upper antenna region, when the user holds the mobile phone close to ear (such as making a call), the antenna radiates to the head of the user at a relatively high level. Moreover, the SAR of the higher-order mode radiation of the IFA antenna is relatively high, which makes it difficult to control the head SAR when the main antenna is disposed in the upper antenna region.

To resolve the foregoing problems, the embodiments of this application provide a low-SAR antenna solution, which can avoid an excessively high SAR value when the main antenna is disposed in the upper antenna region, and can ensure the radiation performance of the antenna.

The solution provided in the embodiments of this application is described below in detail with reference to the accompanying drawings.

It is to be noted that, the low-SAR antenna solution provided in the embodiments of this application may be applied to an electronic device of a user. The electronic device may be provided with an antenna, and the antenna may be used to support the electronic device to implement a wireless communication function. For example, the electronic device may be a portable mobile device such as a mobile phone, a tablet computer, a personal digital assistant (personal digital assistant. PDA), an augmented reality (augmented reality. AR)\virtual reality (virtual reality, VR) device, and a media player, or the electronic device may be a wearable electronic device such as a smartwatch. A specific form of the device is not particularly limited in the embodiments of this application.

Figure 6:
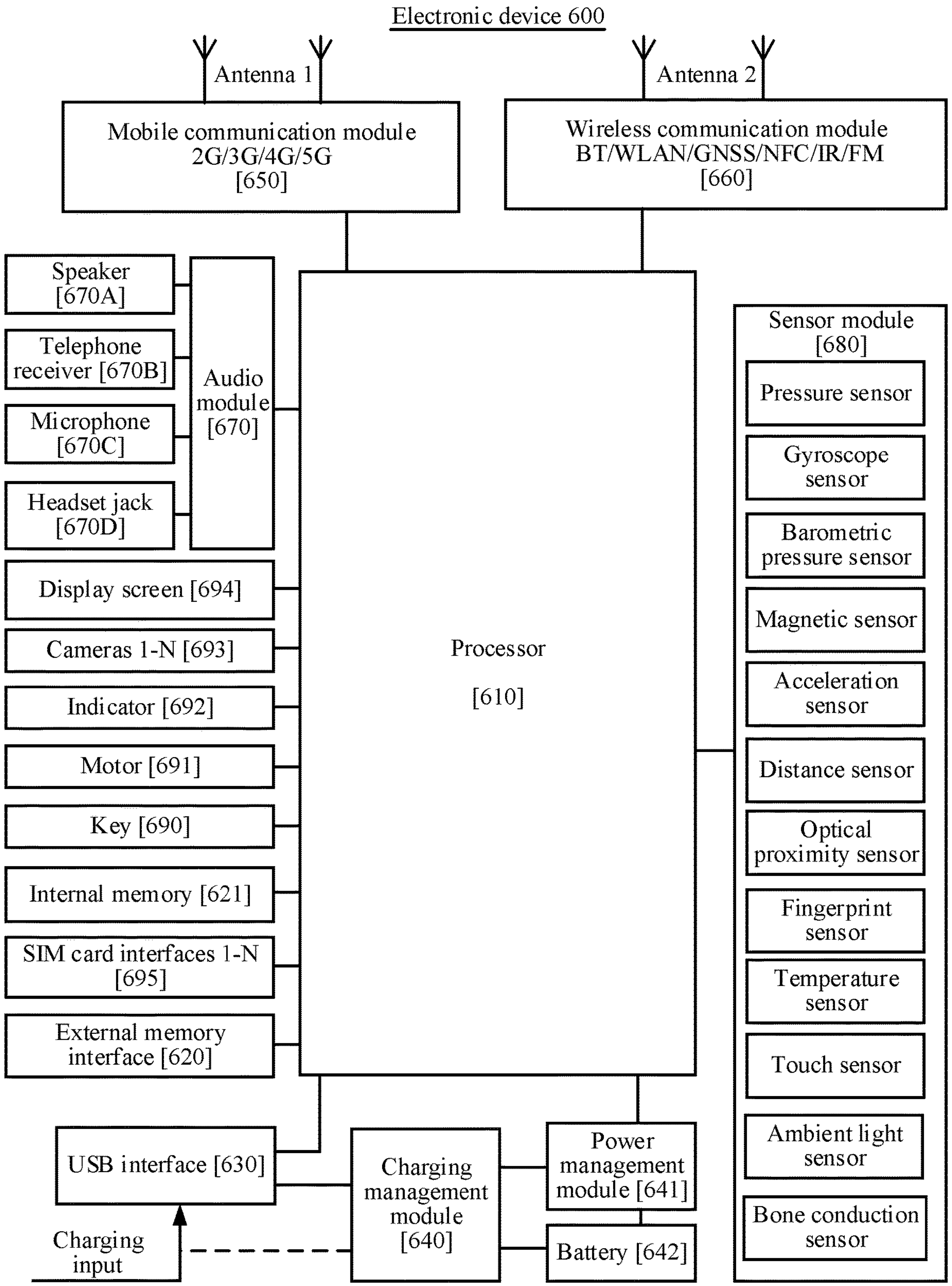
FIG. 6 is a schematic diagram of composition of an electronic device according to an embodiment of this application.

FIG. 6 is a schematic structural diagram of an electronic device 600 according to an embodiment of this application.

As shown in FIG. 6, the electronic device 600 may include a processor 610, an external memory interface 620, an internal memory 621, a universal serial bus (universal serial bus, USB) interface 630, a charging management module 640, a power management module 641, a battery 642, an antenna 1, an antenna 2, a mobile communication module 650, a wireless communication module 660, and an audio module 670, a speaker 670A, a telephone receiver 670B, a microphone 670C, a headset jack 670D, a sensor module 680, a key 690, a motor 691, an indicator 692, a camera 693, a display screen 694, a subscriber identification module (subscriber identification module, SIM) card interface 695, and the like. The sensor module 680 may include a pressure sensor, a gyro sensor, a barometric pressure sensor, a magnetic sensor, an acceleration sensor, a distance sensor, an optical proximity sensor, a fingerprint sensor, a temperature sensor, and a touch sensor, an ambient light sensor, a bone conduction sensor, and the like.

It may be understood that the schematic structure in this embodiment constitutes no specific limitation on the electronic device 600. In some other embodiments, the electronic device 600 may include more or fewer components than those shown in the figures, or some components may be combined, or some components may be split, or components are arranged in different manners. The components in the figure may be implemented by hardware, software, or a combination of software and hardware.

The processor 610 may include one or more processing units. For example, the processor 610 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU), and the like. Different processing units may be independent components, or may be integrated into one or more processors 610. As an example, in this application, the ISP may process images, including automatic exposure (Automatic Exposure), automatic focus (Automatic Focus), automatic white balance (Automatic White Balance), denoising, backlight compensation, color enhancement, and the like. The processing of automatic exposure, automatic focus, and automatic white balance may also be referred to as 3A processing. After processing, the ISP can obtain corresponding images. This process may also be referred to as an image obtaining operation of ISP.

In some embodiments, the processor 610 may include one or more interfaces. The interface may include an integrated circuit (inter-integrated circuit, I2C) interface, an integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The electronic device 600 can implement a photographing function by using the ISP, the camera 693, the video codec, the GPU, the display screen 694, the application processor, and the like.

The ISP is configured to process data fed back by the camera 693. For example, during photographing, a shutter is enabled. Light is transferred to a photosensitive element of the camera 693 through a lens, and an optical signal is converted into an electrical signal. The photosensitive element of the camera 693 transfers the electrical signal to the ISP for processing, and therefore, the electrical signal is converted into an image visible to a naked eye. The ISP may further optimize noise point, brightness, and skin tone algorithms. The ISP may further optimize parameters such as exposure and color temperature of a shooting scene. In some embodiments, the ISP may be disposed in the camera 693.

The camera 693 is configured to capture a static image or a video. An optical image of an object is generated through a lens and is projected to the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into a standard image signal in RGB and YUV formats. In some embodiments, the electronic device 600 may include one or N cameras 693, and N is a positive integer greater than 1.

The digital signal processor is configured to process a digital signal, and in addition to a digital image signal, may further process another digital signal. For example, when the electronic device 600 performs frequency selection, the digital signal processor is configured to perform Fourier transform and the like on frequency energy.

The video codec is configured to compress or decompress a digital video. The electronic device 600 may support one or more video codecs. In this way, the electronic device 600 may play or record videos in a plurality of encoding formats, for example, moving picture experts group (moving picture experts group, MPEG) 1, MPEG 2, MPEG 3, MPEG 4, or the like.

The NPU is a neural-network (neural-network, NN) computing processor, quickly processes input information by referring to a structure of a biological neural network, for example, a transmission mode between neurons in a human brain, and may further continuously perform self-learning. The NPU may be used to implement an application such as intelligent cognition of the electronic device 600, for example, image recognition, facial recognition, voice recognition, and text understanding.

The charging management module 640 is configured to receive a charging input from a charger. The charger may be a wireless charger or may be a wired charger. In some embodiments of wired charging, the charging management module 640 may receive charging input of a wired charger by using the USB interface 630. In some embodiments of wireless charging, the charging management module 640 may receive wireless charging input by using a wireless charging coil of the electronic device 600. When charging the battery 642, the charging management module 640 may further supply power to the electronic device 600 by using the power management module 641.

The power management module 641 is configured to connect to the battery 642, the charging management module 640, and the processor 610. The power management module 641 receives an input of the battery 642 and/or the charging management module 640, to supply power to the processor 610, the internal memory 621, an external memory, the display screen 694, the camera 693, the wireless communications module 660, and the like. The power management module 641 may be further configured to monitor a parameter such as a capacity of the battery 642, a cycle count of the battery 642, or a health state (electric leakage and impedance) of the battery 642. In some other embodiments, the power management module 641 may be alternatively disposed in the processor 610. In some other embodiments, the power management module 641 and the charging management module 640 may further be configured in the same device.

A wireless communication function of the electronic device 600 may be implemented by using the antenna 1, the antenna 2, the mobile communication module 650, the wireless communication module 660, the modem processor 610, the baseband processor 610, and the like.

The antenna 1 and the antenna 2 are configured to transmit and receive an electromagnetic wave signal. Each antenna of the electronic device 600 may be configured to cover one or more communication frequency bands. Different antennas may also be multiplexed to improve utilization of the antennas. For example, an antenna 1 may be multiplexed as a diversity antenna of a wireless local area network. In some other embodiments, the antenna may be used in combination with a tuning switch.

The mobile communication module 650 may provide a solution to wireless communication such as 2G/3G/4G/5G applicable to the electronic device 600. The mobile communication module 650 may include at least one filter, a switch, a power amplifier, a low noise amplifier (low noise amplifier, LNA), and the like. The mobile communication module 650 may receive an electromagnetic wave through the antenna 1, perform processing such as filtering and amplification on the received electromagnetic wave, and transmit a processed electromagnetic wave to the modem processor for demodulation. The mobile communication module 650 may further amplify a signal modulated by the modem processor, and convert the signal into an electromagnetic wave for radiation through the antenna 1. In some embodiments, at least some function modules of the mobile communications module 650 may be disposed in the processor 610. In some embodiments, at least some function modules of the mobile communications module 650 and at least some modules of the processor 610 may be disposed in a same component.

The modem processor may include a modulator and a demodulator. The modulator is configured to modulate a to-be-sent low-frequency baseband signal into a middle/high-frequency signal. The demodulator is configured to demodulate a received electromagnetic wave signal into a low-frequency baseband signal. Next, the demodulator transmits the demodulated low-frequency baseband signal to the baseband processor for processing. The low-frequency baseband signal is processed by the baseband processor and then transmitted to an application processor. The application processor outputs a sound signal through an audio device (which is not limited to the speaker 670A, the phone receiver 670B, and the like), or displays an image or a video through the display screen 694. In some embodiments, the modem processor may be an independent component. In some other embodiments, the modem processor may be independent of the processor 610, and the modem processor and the mobile communication module 650 or another functional module may be disposed in the same component.

The wireless communication module 660 may provide a solution for wireless communication including a wireless local area network (wireless local area networks, WLAN) (such as a wireless fidelity (wireless fidelity, Wi-Fi) network), Bluetooth (bluetooth, BT), and a global navigation satellite system (global navigation satellite system, GNSS), frequency modulation (frequency modulation, FM), a near field communication (near field communication, NFC) technology, an infrared (infrared, IR) technology, and the like to be applied to the electronic device 600. The wireless communication module 660 may be one or more devices integrating at least one communication processing module. The wireless communication module 660 receives an electromagnetic wave through the antenna 2, performs frequency modulation and filtering processing on an electromagnetic wave signal, and sends a processed signal to the processor 610. The wireless communication module 66) may alternatively receive a to-be-sent signal from the processor 610, perform frequency modulation and amplification on the to-be-sent signal, and convert the signal into an electromagnetic wave for radiation by using the antenna 2.

In some embodiments, in the electronic device 600, the antenna 1 is coupled to the mobile communication module 650, and the antenna 2 is coupled to the wireless communication module 660, so that the electronic device 600 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access. WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a Beidou navigation satellite system (beidou navigation satellite system, BDS), a quasi-zenith satellite system (quasi-zenith satellite system, QZSS) and/or satellite-based augmentation systems (satellite based augmentation systems, SBAS).

The electronic device 600 implements a display function by using the GPU, the display screen 694, the application processor 610, and the like. The GPU is a microprocessor for image processing, and is connected to the display screen 694 and the application processor. The GPU is configured to perform mathematical and geometric calculation, and is configured to render graphics. The processor 610 may include one or more GPUs, and execute program instructions to generate or change display information.

The display screen 694 is configured to display an image, a video, and the like. The display screen 694 includes a display panel. The display panel may be a liquid crystal display (liquid crystal display, LCD) 694, an organic light-emitting diode (organic light-emitting diode, OLED), an active-matrix organic light emitting diode (active-matrix organic light emitting diode, AMOLED), a flexible light-emitting diode (flex light-emitting diode, FLED), a Miniled, a MicroLed, a Micro-oLed, quantum dot light emitting diodes (quantum dot light emitting diodes, QLED), and the like. In some embodiments, the electronic device 600 may include one or N display screens 694. N is a positive integer greater than 1.

The external memory interface 620 may be configured to connect to an external storage card such as a micro SD card, to expand a storage capability of the electronic device 600. The external storage card communicates with the processor 610 by using the external memory interface 620, to implement a data storage function, such as storing a file such as a music or a video in the external storage card.

The internal memory 621 may be configured to store computer executable program code, and the executable program code includes instructions. The processor 610 runs the instruction stored in the internal memory 621, to perform various function applications and data processing of the electronic device 600. The internal memory 621 may include a program storage region and a data storage region. The program storage area may store an operating system, an application required by at least one function (for example, a sound playing function or an image playing function), and the like. The data storage region may store data (for example, audio data and an address book) and the like created when the electronic device 600 is used. In addition, the internal memory 621 may include a high-speed random access memory, or may include a non-volatile memory such as at least one magnetic disk memory, a flash memory, or a universal flash storage (universal flash storage, UFS).

The electronic device 600 may implement an audio function by using the audio module 670, the speaker 670A, the telephone receiver 670B, the microphone 670C, the headset jack 670D, the application processor 610, and the like, such as music playing or recording.

The audio module 670 is configured to convert digital audio information into an analog audio signal output, and is further configured to convert an analog audio input into a digital audio signal. The audio module 670 may be further configured to encode and decode an audio signal. In some embodiments, the audio module 670 may be configured in the processor 610, or some functional modules of the audio module 670 may be configured in the processor 610. The speaker 670A, also referred to as a "horn", is configured to convert an audio electrical signal into a sound signal. Music can be listened to or a hands-free call can be answered by using the speaker 670A in the electronic device 600. The telephone receiver 670B, also referred to as a "receiver", is configured to convert an audio electrical signal into a sound signal. When the electronic device 600 is used to answer a call or receive voice information, the telephone receiver 670B may be put close to a human ear, to receive the voice information. The microphone 670C, also referred to as a "microphone" or a "microphone", is configured to convert a sound signal into an electrical signal. When making a call or sending voice information or requiring a voice assistant to trigger the electronic device 600 to perform some functions, a user may speak with the mouth approaching the microphone 670C, to input a sound signal to the microphone 670C. At least one microphone 670C may be disposed in the electronic device 600. In some other embodiments, two microphones 670C may be disposed in the electronic device 600, to collect a sound signal and implement a noise reduction function. In some other embodiments, three, four, or more microphones 670C may be alternatively disposed in the electronic device 600, to collect a sound signal, implement noise reduction, recognize a sound source, implement a directional recording function, and the like. The headset jack 670D is configured to connect to a wired headset. The headset jack 670D may be a USB interface 630, or may be a 3.5 mm open mobile electronic device 600 platform (open mobile terminal platform, OMTP) standard interface, or a standard interface of Cellular Telecommunications Industry Association of the USA (cellular telecommunications industry association of the USA, CTIA).

The touch sensor is also referred to as a "touch panel". The touch sensor may be disposed on the display screen 694. The touch sensor and the display screen 694 form a touch-screen, which is also referred to as a "touch control screen". The touch sensor is configured to detect a touch operation performed on or near the touch sensor. The touch sensor may transmit the detected touch operation to the application processor, to determine a touch event type. In some embodiments, the touch sensor may provide a visual output related to the touch operation by using the display screen 694. In some other embodiments, the touch sensor may be alternatively disposed on a surface of the electronic device 600, and is located on a position different from that of the display screen 694.

The pressure sensor is configured to sense a pressure signal, and may convert the pressure signal into an electrical signal. In some embodiments, the pressure sensor may be disposed in the display screen 694. There are a plurality of types of pressure sensors, for example, a resistive pressure sensor, an inductive pressure sensor, and a capacitive pressure sensor. The capacitive pressure sensor may include at least two parallel plates having conductive materials. When force is exerted on the pressure sensor, capacitance between electrodes changes. The electronic device 600 determines strength of pressure based on a change of the capacitance. When a touch operation is performed on the display screen 694, the electronic device 600 detects strength of the touch operation by using the pressure sensor. The electronic device 600 may further calculate a position of the touch based on a detection signal of the pressure sensor. In some embodiments, touch operations that are performed on a same touch position but have different touch operation strength may correspond to different operation instructions. For example, when a touch operation whose touch operation strength is less than a first pressure threshold is performed on an SMS message application icon, an instruction of checking an SMS message is executed. When a touch operation whose touch operation strength is greater than or equal to the first pressure threshold is performed on the SMS message application icon, an instruction of creating a new SMS message is executed. The gyroscope sensor may be configured to determine a motion posture of the electronic device 600. The acceleration sensor may detect an acceleration value of the electronic device 600 in each direction (generally three axes). The distance sensor is configured to measure a distance. The electronic device 60) may measure a distance through infrared or laser. The electronic device 600 may detect, by using the optical proximity sensor, that a user holds the electronic device 600 close to an ear for a call, so that automatic screen-off is implemented to achieve power saving. The ambient light sensor is configured to sense a brightness of ambient light. The fingerprint sensor is configured to collect a fingerprint. The temperature sensor is configured to detect temperature. In some embodiments, the electronic device 600 executes a temperature processing policy by using temperature detected by the temperature sensor. The audio module 670 may obtain a voice signal through parsing based on the vibration signal, of the vibration bone of the vocal-cord part, that is obtained by the bone conduction sensor, to implement a voice function. The application processor may parse heart rate information based on the blood pressure beating signal obtained by the bone conduction sensor, to implement a heart rate detection function.

A key 690 includes a power key, a volume key, and the like. The motor 691 may generate a vibration prompt. The indicator 692 may be an indicator light, may be configured to indicate a charging state and a battery change, and may be further configured to indicate a message, a missed call, a notification, and the like. The SIM card interface 695 is configured to connect to a SIM card. The electronic device 600 may support one or N SIM card interfaces 695, and N is a positive integer greater than 1. The SIM card interface 695 may support a Nano SIM card, a Micro SIM card, a SIM card, and the like. A plurality of cards may be simultaneously inserted into the same SIM card interface 695. The SIM card interface 695 may also be compatible with different types of SIM cards. The SIM card interface 695 may also be compatible with an external storage card. The electronic device 600 interacts with the network by the SIM card to implement functions such as call and data communication. In some embodiments, the electronic device 600 uses an eSIM, that is, an embedded SIM card. The eSIM card may be embedded in the electronic device 600 and cannot be separated from the electronic device 600.

The low-SAR antenna solution provided in the embodiments of this application can be applied to the electronic device having the composition shown in FIG. 6. For example, the solution provided in the embodiments of this application can be applied to the antenna 1 to implement low-SAR and high-efficiency radiation.

It is to be noted that the composition of the electronic device shown in FIG. 6 is merely an example, and does not constitute a limitation on an application environment of the solution provided in the embodiments of this application. For example, in some embodiments, the electronic device may also include other components. For example, referring to FIG. 7, the electronic device 600 may include a communication module configured to implement a wireless communication function of the electronic device 600.

Figure 7:
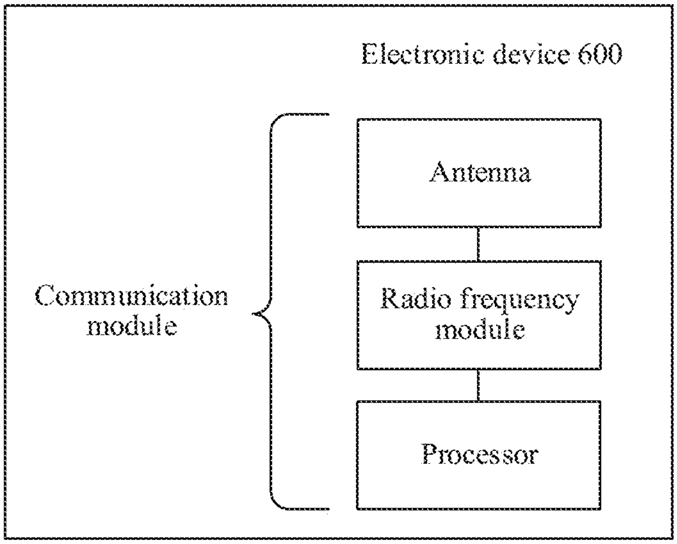
FIG. 7 is a schematic diagram of composition of an electronic device according to an embodiment of this application.

In the example shown in FIG. 7, the communication module may include an antenna, a radio frequency module coupled to the antenna, and a processor When the communication module is configured to implement main frequency radiation, the antenna may be an antenna covering the main frequency band. The radio frequency module may include components such as a filter, a power amplifier, and a radio frequency switch, which are configured to process received and sent signals in a radio frequency domain. The processor may include a baseband processor. The processor may be coupled to the radio frequency module and is configured to process received and sent signals in a digital domain.

The antenna solution provided in the embodiments of this application can also be applied to the antenna shown in FIG. 7.

Figure 8:
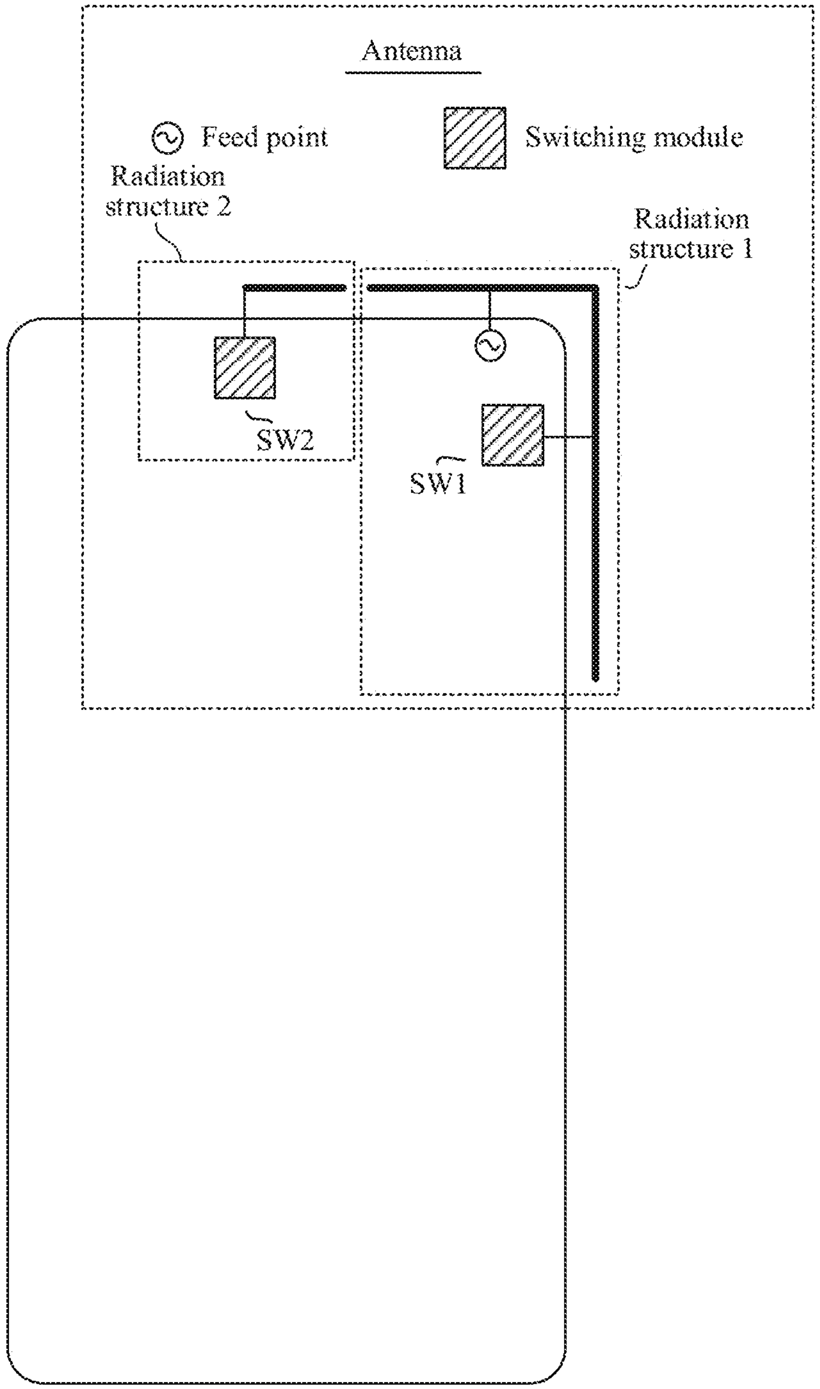
FIG. 8 is a schematic diagram of composition of an antenna according to an embodiment of this application.

For example, FIG. 8 is a schematic diagram of a low-SAR antenna according to an embodiment of this application.

In this example, the antenna may be disposed in an upper antenna region of the electronic device, so as to avoid the influence of the user holding the electronic device on the antenna. It is to be noted that, for ease of description, an example in which the electronic device is a mobile phone is used in the following examples. The schematic diagram of a position of the antenna in the mobile phone is a back view of the mobile phone.

The low-SAR antenna provided in the embodiments of this application may include at least two radiation structures. For example, a first radiation structure is configured to achieve low-frequency radiation, and a second radiation structure is configured to achieve middle/high-frequency radiation.

Referring to FIG. 8, in an example, the first radiation structure is a radiation structure 1, and the second radiation structure is a radiation structure 2. The two radiation structures in this example are described below.

In this example, the radiation structure 1 may implement its low-frequency radiation function through an IFA antenna.

For example, as shown in FIG. 8, the radiation structure 1 may include at least one radiator, a feed point, and a switching module (for example, SW1). The radiator in the radiation structure 1 may be located at an upper right position of the mobile phone. The radiator in the radiation structure 1 is implemented in any one or more of the following forms: a flexible printed circuit (Flexible Printed Circuit, FPC) antenna, a stamping (stamping) metal antenna, and a laser-direct-structuring (Laser-Direct-structuring, LDS) antenna. In some implementations, a metal structural member in the mobile phone may be reused for the radiator in the radiation structure 1. For example, when the mobile phone is designed with a metal frame, the metal frame may be disposed at a position corresponding to the radiation structure 1 shown in FIG. 8 to implement the radiation function of the radiator.

The feed point may be provided at a position where the radio frequency module is coupled to the antenna. To implement the feeding function, components such as a metal elastic piece and a thimble may be used at the feed point to implement the coupling between the circuit and the radiator of the antenna. For example, the radio frequency module is disposed on a printed circuit board (printed circuit board, PCB). In a transmission scenario, radio frequency signals may be transmitted to an electrical connection component (such as the metal elastic piece or the thimble) at the feed point through a radio frequency circuit on the PCB, so that the radio frequency signals can be transmitted to the radiator of the antenna through the rigid connection of the electrical connection component or through the welding of conductive materials such as electronic circuits on the FPC. Therefore, the radiator of the antenna can transmit the radio frequency signals (analog signals) in the form of electromagnetic waves in the working frequency band corresponding to the antenna. For example, the radiator of the radiation structure 1 may work in a low frequency band, then after receiving the radio frequency signals from the feed point, the radiator of the radiation structure 1 may transmit the radio frequency signals in the form of electromagnetic waves at the low frequency. Correspondingly, in a receiving scenario, the radiator of the radiation structure 1 may receive low-frequency electromagnetic wave signals (that is, low-frequency electromagnetic waves), convert the low-frequency electromagnetic waves into analog signals, and feed them back to the radio frequency module through the feed point, thereby receiving low-frequency signals.

It is to be noted that, in the embodiments of this application, the feed point may be provided at a position of an upper right corner at the top of the mobile phone. As a result, a current intensity point of the excitation ground and a current intensity point of the eigenmode of the ground are separated from each other, so that the ground current is dispersed more effectively, achieving the effect of reducing the SAR value. In addition, by providing the feed point at the upper right corner at the top of the mobile phone, the horizontal and vertical currents on the ground can be better excited, increasing the antenna efficiency and bandwidth.

In some embodiments, a matching circuit (not shown in FIG. 8) may be provided between the feed point and the radio frequency module. The matching circuit may be configured to tune the working frequency band of the antenna, and adjust the impedance of the antenna to match the radio frequency module by switching or adjusting (for example, tuning to 75 ohms or 50 ohms), thereby reducing the signal reflection at the antenna port and improving the signal transmission or reception efficiency.

In the radiation structure 1 shown in FIG. 8, the switching module SW1 may be configured to switch the radiation structure 1 to work in different low-frequency states, so that the radiation structure 1 can cover a full low-frequency band. In some implementations, one end of SW1 may be coupled to the radiator of the radiation structure 1, and the other end of [SW2] SW1 may be grounded.

It may be understood that, based on the foregoing description, when the antenna shown in FIG. 8 works at a low frequency, the antenna may work in the ¼ mode of IFA, that is, in the fundamental mode, so good radiation performance and low SAR value can be provided.

Further referring to FIG. 8, in the solution provided in this example, the antenna may also include a radiation structure 2.

The radiation structure 2 may cooperate with the radiation structure 1 to implement middle/high-frequency radiation.

In this example, the radiation structure 2 may include at least one radiator. One end of the radiator of the radiation structure 2 may be close to the radiator of the radiation structure 1 to be electrically coupled to the radiator of the radiation structure 1. The other end of the radiator of the radiation structure 2 may be coupled to SW2.

When the antenna shown in FIG. 8 works at a middle/high frequency, the radiator of the radiation structure 1 can be coupled to the radiator of the radiation structure 2 through the gap, and the top radiator is excited to obtain a slot common mode (slot common mode, Slot CM) and a slot differential mode (slot differential mode, Slot DM). For convenience of description, in the following, the Slot CM mode is referred to as CM mode for short, and the Slot DM mode is referred to as DM mode for short. The radiation in the middle/high frequency band can be generated by exciting the CM mode and the DM mode, thereby achieving middle/high-frequency coverage of the antenna.

In some embodiments, the switching module (for example, SW2) in the radiation structure 2 may tune the top stub resonance to 1710-2690 MHz by loading a capacitor, so as to achieve the middle/high-frequency coverage.

It may be understood that, in the antenna solution provided in this example, the middle/high frequency is covered through the CM mode and the DM mode, replacing the conventional solution of middle/high-frequency coverage in the higher-order mode of the IFA antenna, so the SAR value at the middle/high frequency can be reduced while significantly improving the radiation performance of the antenna at the middle/high frequency.

Figure 9:
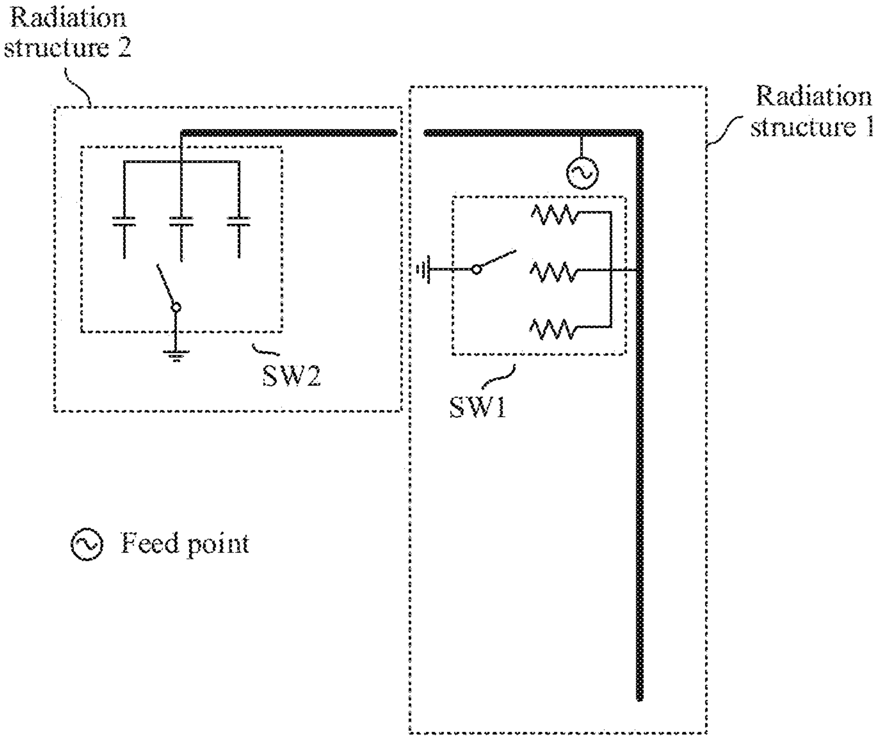
FIG. 9 is a schematic diagram of composition of an antenna according to an embodiment of this application.

As a specific implementation, FIG. 9 shows a specific composition of the antenna solution with logical composition shown in FIG. 8. In this example, a specific implementation of SW1 and SW2 is provided.

As shown in FIG. 9, in this example, SW1 and SW2 may be implemented by a single pole n throw (Single Pole N Throw, SPNT) switch. For example, as shown in FIG. 9, SW1 and SW2 may implement the switching function by single pole triple throw. In some other implementations, there may be other quantity of switching state of the single pole n throw switch, for example, the switching of at least three states (1-on, 2-on, and full-off) is implemented by a single pole double throw (SPDT) switch. It is to be noted that, in some other implementations of this application, SW1 and SW2 may implement the function by other components with the switching function. For example, as a possible design. SW1 and/or SW2 may implement the switching function by an adjustable/variable device. In some other designs, SW1 and/or SW2 may implement the switching function by n pole n throw. For example, SW1 and/or SW2 may implement the switching of at least four states (01, 10, 00, and 11) through 2*SPST.

In some embodiments of this application, an inductor may be loaded on different paths of SW1 for low-frequency switching. In the example shown in FIG. 9, when SW1 conducts one of the paths, the radiator of the radiation structure 1 can be grounded, thereby forming the radiation form of IFA.

It is to be noted that, in some embodiments of this application, a small capacitor (for example, a capacitor less than 2 pF) may be connected in series between the radiator of the radiation structure 1 and the feed of the radio frequency circuit, so that the left-hand mode can be excited and obtained on the radiation structure 1, thereby achieving low-frequency excitation in a small space. For example, after a small capacitor is connected in series between the radiator of the radiation structure 1 and the radio frequency circuit, a current without a reverse point can be formed on the entire radiator of the radiation structure 1. This current distribution is also the current distribution in the left-hand mode. It is to be understood that the excitation of the left-hand mode can successfully excite low-frequency radiation in a small space. In the case of exciting the left-hand mode, by switching different paths on SW1, the radiator can return to the ground through inductors of different sizes, which can play the role of switching the low-frequency resonance, so that the low-frequency resonance in different states can cooperate to cover the full LB frequency band.

The working mechanism of the antenna solution shown in FIG. 9 will be described in detail with reference to FIG. 10 to FIG. 15 below. In order to clearly describe the working mechanism of the antenna solution provided by the embodiments of this application, the working situation of the radiation structure 1 is first described below.

Figure 10:
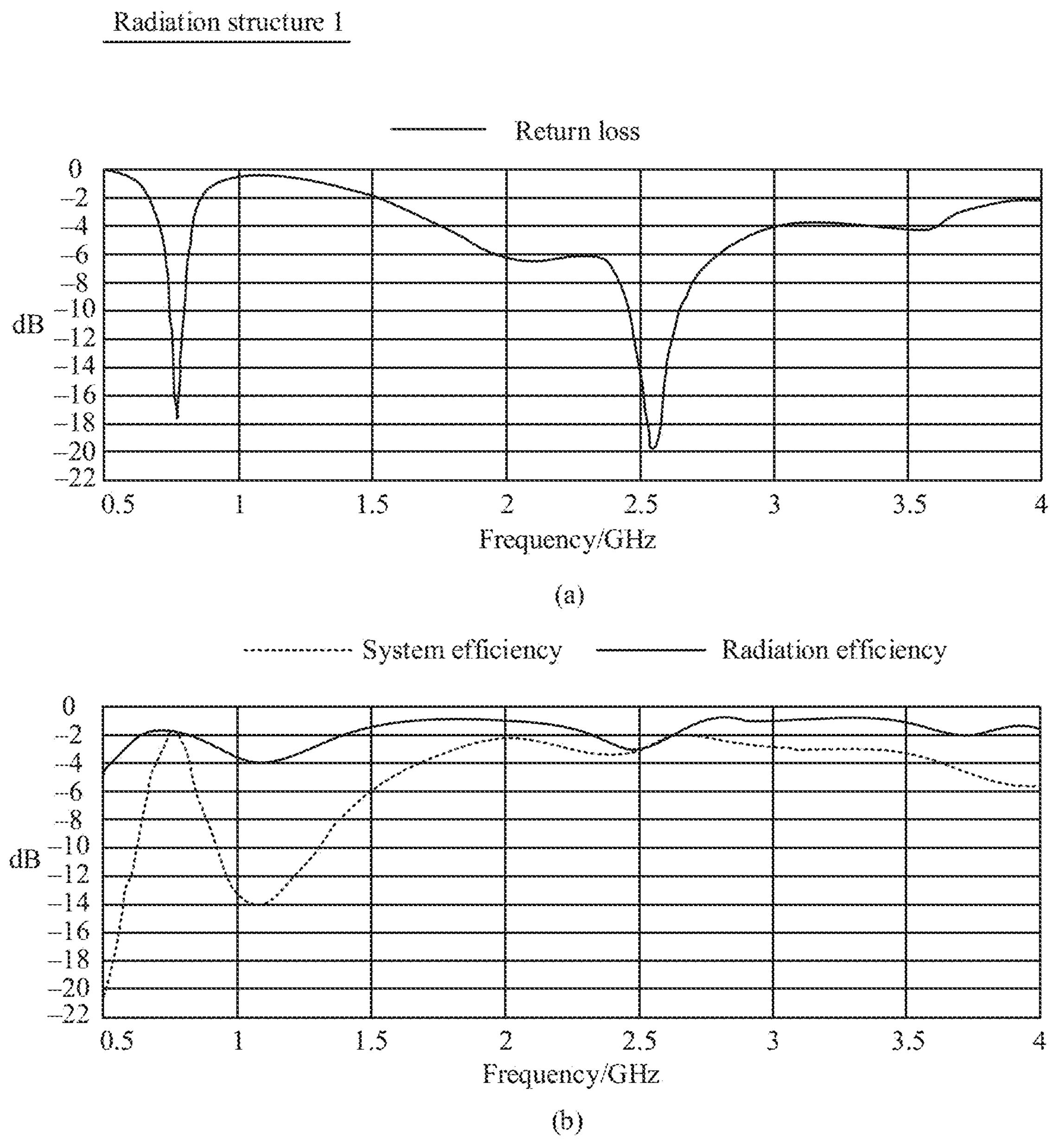
FIG. 10 is a schematic diagram of S-parameters of an antenna according to an embodiment of this application.

FIG. 10 shows the antenna radiation when the radiation structure 1 works alone. FIG. 10(*a*) shows S11 when the radiation structure 1 works alone. It can be seen that when the radiation structure 1 works alone, the deepest low-frequency resonance has exceeded −16 dB, which is ideal. In terms of the middle/high frequency, as a typical IFA antenna, the higher-order mode is excited on the radiator for middle/high-frequency radiation. As shown in (a) of FIG. 10, the resonances corresponding to the higher-order mode are obtained around 2 GHz and around 2.5 GHz.

FIG. 10(*b*) shows the system efficiency and radiation efficiency when the radiation structure 1 works alone. The radiation efficiency (radiation efficiency) can be used to identify the difference between the input energy from the port and the energy fed back to the port through radiation and loss under the single-port excitation of the current antenna system. A higher radiation efficiency indicates a smaller energy fed back to the port, indicating that the current antenna system can provide a stronger radiation capability. Correspondingly, the system efficiency (system efficiency) can be used to identify the difference between the input energy from the port and the energy fed back to the port through radiation under the single-port excitation of the current antenna system. A higher system efficiency indicates that the antenna radiates more energy, that is, the radiation performance of the antenna is higher. In other words, in an ideal case, the system efficiency of the current antenna system can reach the level of radiation efficiency, and the radiation efficiency can be the maximum radiation capability that can be provided by the current antenna system.

As shown in FIG. 10(*b*), when the radiation structure 1 works alone, the system efficiency at the middle/high frequency (1.7-3 GHz) is above −4 dB, indicating that the radiation structure 1 can provide a strong middle/high-frequency efficiency.

Figure 11:
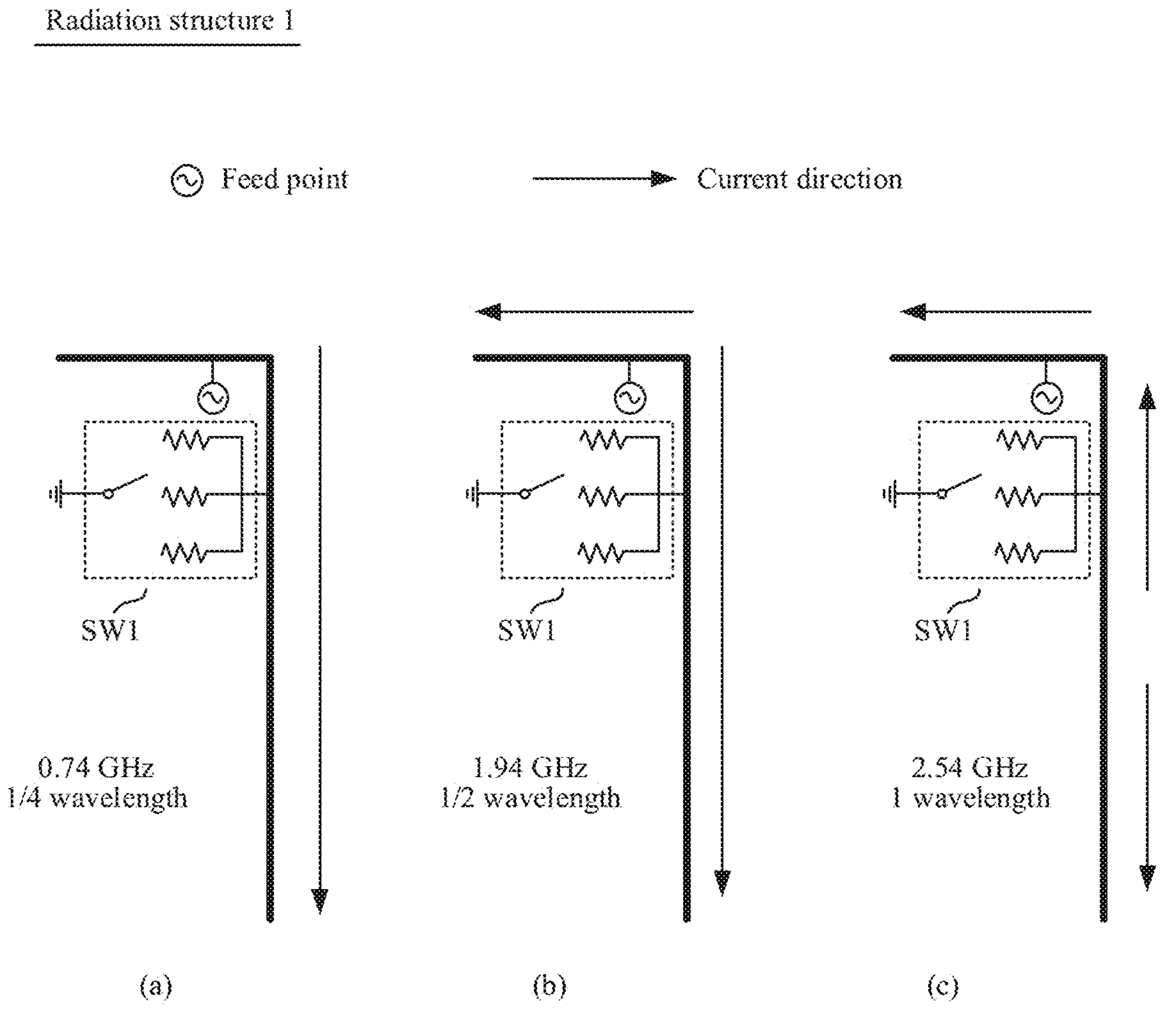
FIG. 11 is a schematic diagram of a flowing direction of a current according to an embodiment of this application.

FIG. 11 shows a flowing direction of a current when the radiation structure 1 works alone. As shown in FIG. 11(*a*), 0.74 GHz (that is, low frequency) can work in a ¼ wavelength mode. As shown in FIG. 11(*b*), 1.94 GHz (that is, middle frequency) can work in a ½ wavelength mode. As shown in FIG. 11(*c*), 2.54 GHz (that is, high frequency) can work in a 1 wavelength mode.

It can be further indicated from the current shown in FIG. 11 that the middle/high-frequency resonance shown in FIG. 10(*a*) is the radiation generated by the higher-order mode of the IFA antenna.

In combination with the description for FIG. 3 to FIG. 5, it may be understood that when the radiation structure 1 works alone, since the middle/high-frequency radiation is provided by the higher-order mode of the IFA, even if a better system efficiency or radiation efficiency can be provided, the problem of an excessively high SAR value will occur.

In the embodiments of this application, further referring to FIG. 9, the antenna may also include a radiation structure 2 in addition to the radiation structure 1. The radiation structure 2 can form the excitation of the CM mode and the DM mode with the top structure of the radiation structure 1 in the form of electric field coupling, so as to adjust the excitation mode of the middle/high frequency, thereby avoiding an excessively high SAR value while obtaining a good system efficiency or radiation efficiency.

Figure 12:
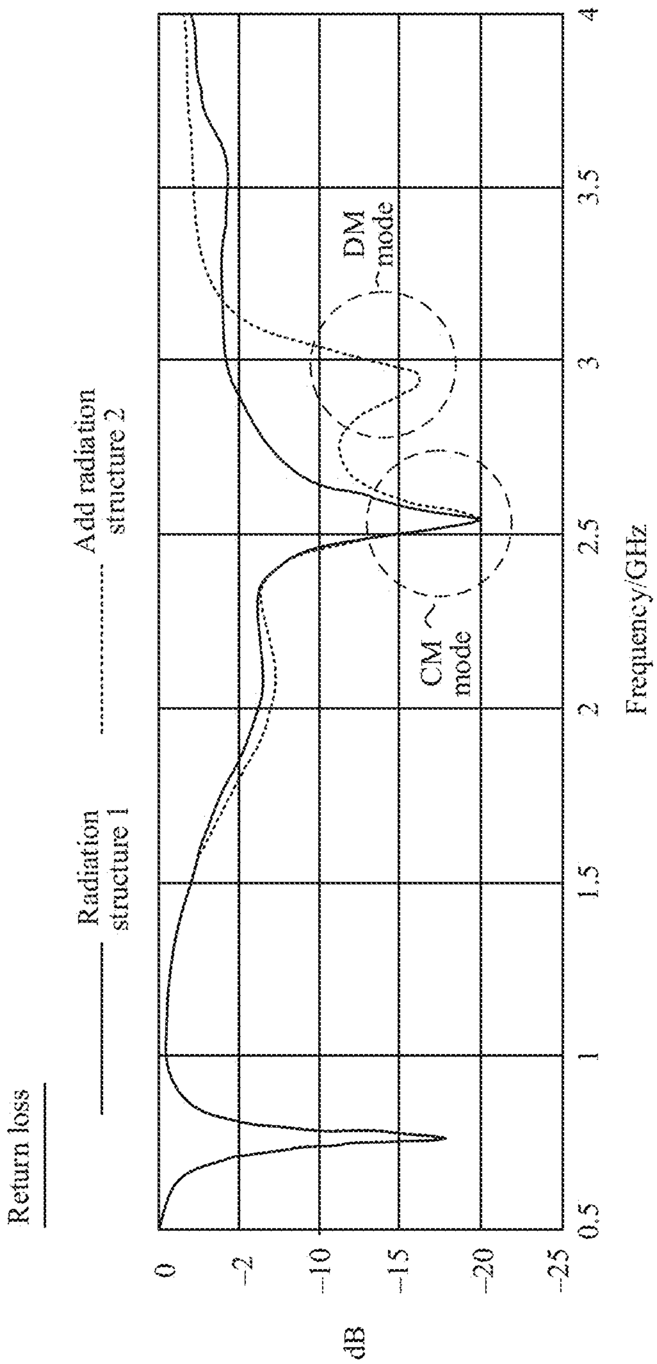
FIG. 12 is a schematic diagram of S-parameters of an antenna according to an embodiment of this application.

For example, FIG. 12 shows S11 when the antenna with the composition shown in FIG. 9 is working. That is, FIG. 12 is the result of working together of the radiation structure 1 and the radiation structure 2.

For ease of description, in the example of FIG. 12, S11 when only the radiation structure 1 works is also shown as a comparison.

As shown in FIG. 12, after the radiation structure 2 is added, the CM mode and DM mode coverage is excited and obtained at the middle/high frequency. In this way, an excessively high SAR value of the higher-order mode of the IFA antenna can be avoided.

Figure 13A:
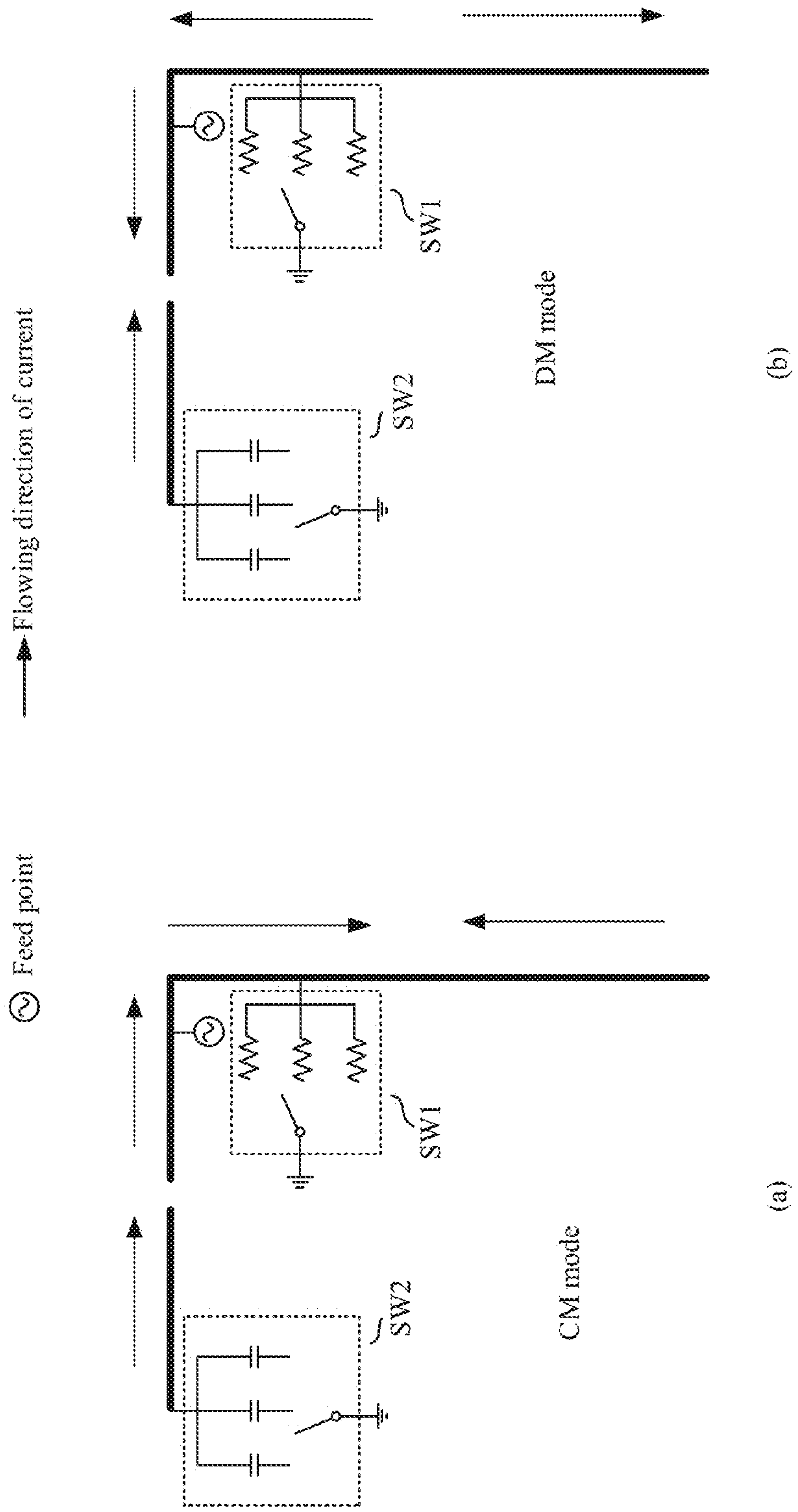
FIG. 13A is a schematic diagram of a flowing direction of a current according to an embodiment of this application.

As an example, FIG. 13A shows a flowing direction of a current at the middle/high frequency when the radiation structure 1 and the radiation structure 2 work together at the same time. For example, FIG. 13A(a) shows a flowing direction of a current of a frequency point around 2.5 GHz. It can be seen that a current distribution in the same direction can be generated on the top radiator (including a top portion of the radiator of the radiation structure 1 and the radiator of the radiation structure 2). Since the top portion of the radiator of the radiation structure 1 and the radiator of the radiation structure 2 are not electrically connected, that is, there is a gap, the current distribution can constitute radiation in the CM mode. Referring to S11 shown in FIG. 12, it can be seen that the CM mode can cover the middle frequency for radiation.

FIG. 13A(b) shows a flowing direction of a current of a frequency point around 2.7 GHz. It can be seen that a current distribution in the opposite direction can be generated on the top radiator (including a top portion of the radiator of the radiation structure 1 and the radiator of the radiation structure 2). Since the top portion of the radiator of the radiation structure 1 and the radiator of the radiation structure 2 are not electrically connected, that is, there is a gap, the current distribution can constitute radiation in the DM mode. Referring to S11 shown in FIG. 12, it can be seen that the DM mode can cover the high frequency for radiation.

Figure 13B:
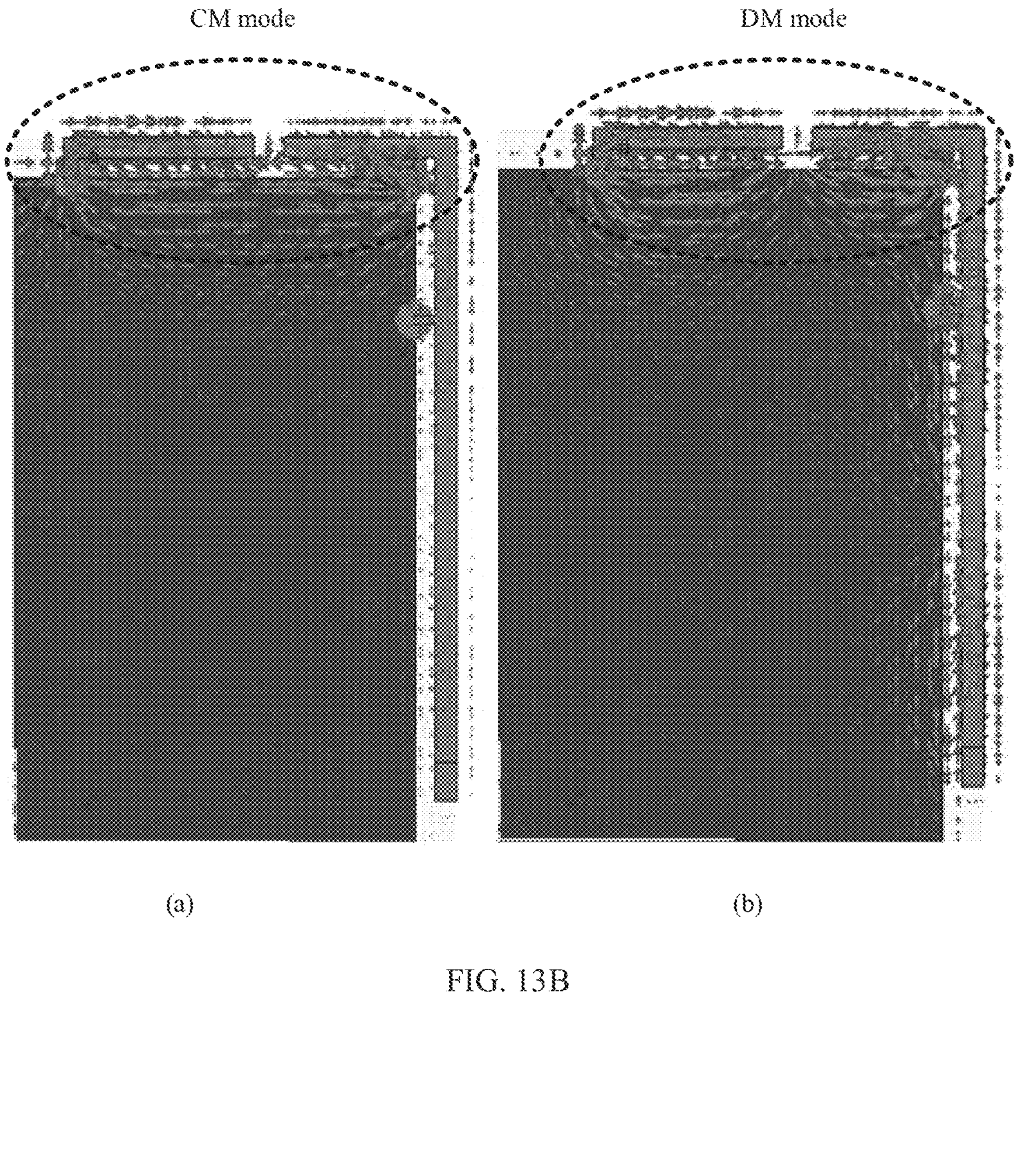
FIG. 13B is a schematic diagram of a simulation result according to an embodiment of this application.

FIG. 13B shows a simulated current distribution in an actual model of the CM mode and the DM mode. As shown in FIG. 13B(a), it can be seen that at the middle/high frequency, the CM mode can excite the top radiator to obtain the current in the same direction (across the gap), while the current on the long stub at the side of the mobile phone is small. As shown in FIG. 13B(b), the DM mode can excite the radiators respectively on both side of the gap to obtain the current in the opposite direction, while the current on the long stub at the side of the mobile phone is small. Therefore, it can be proved that the effect of obtaining the CM mode and the DM mode at the top through excitation can be achieved by adding the radiation structure 2.

Figure 14:
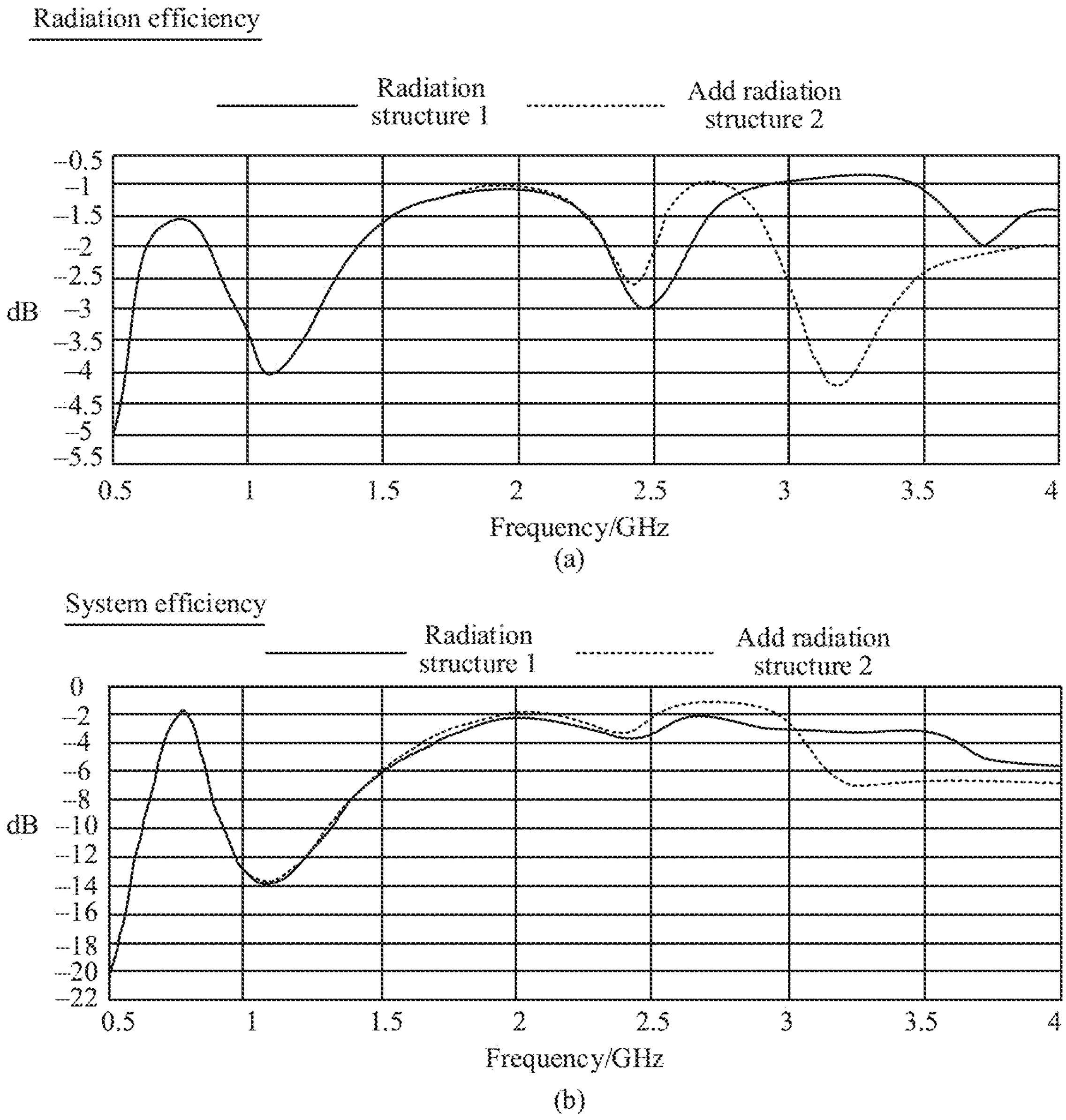
FIG. 14 is a schematic diagram of S-parameters of an antenna according to an embodiment of this application.

FIG. 14 shows the change of the radiation efficiency and system efficiency of the entire antenna system after the radiation structure 2 is added. As shown in FIG. 14(*a*), after the radiation structure 2 is added, the radiation efficiency between 2.3 GHz and 2.7 GHz is significantly increased. Therefore, it can be determined that after the DM mode and the CM mode are introduced by adding the radiation structure 2, the radiation performance that can be provided by the entire antenna system is optimized. As shown m FIG. 14(*b*), after the radiation structure 2 is added, the system efficiency in the full middle/high-frequency band is increased. Therefore, after the DM mode and the CM mode are introduced by adding the radiation structure 2, the radiation performance that is actually provided by the entire antenna system is also optimized. As a result, compared with a typical IFA antenna, the radiation structure 1 and the radiation structure 2 working together at the same time can provide better radiation performance.

Figure 15:
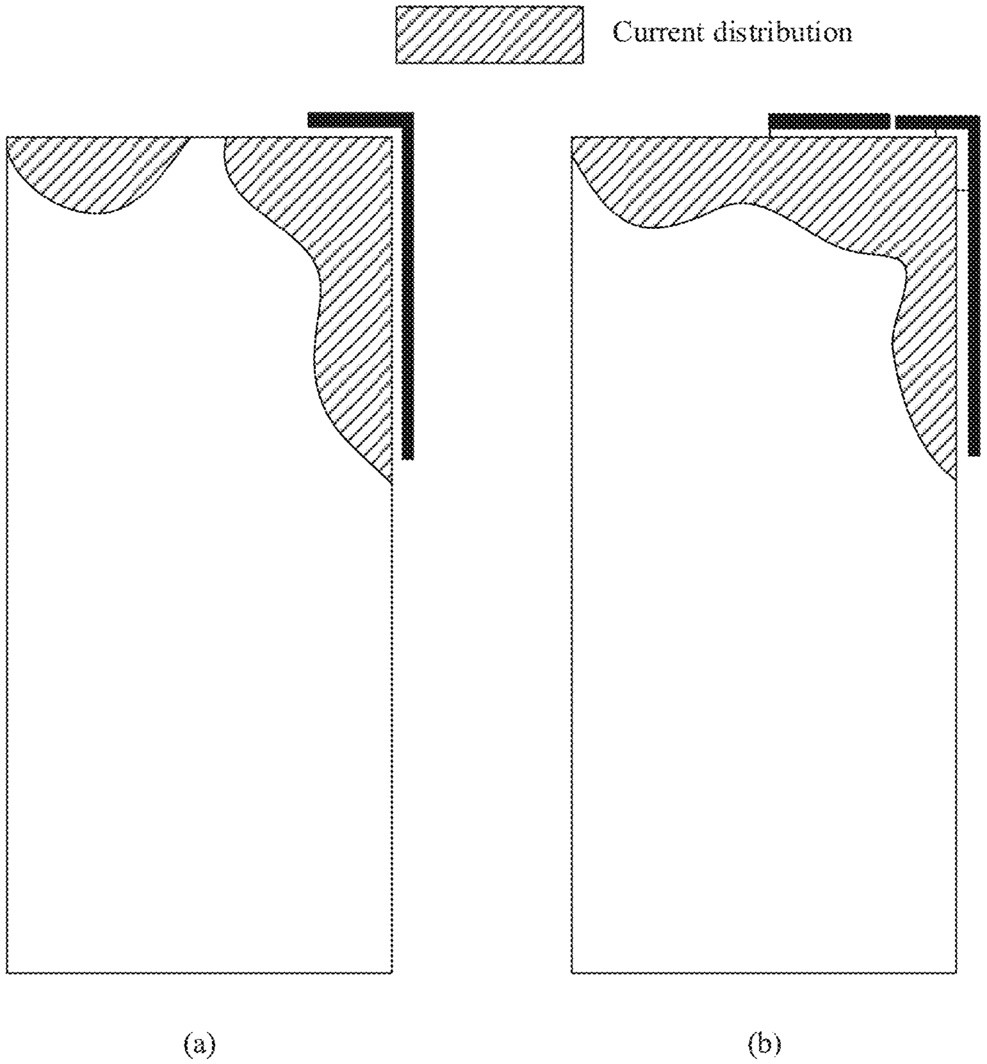
FIG. 15 is a schematic diagram of current distribution according to an embodiment of this application.

In order to describe that the antenna solution provided by the embodiments of this application also has the effect of optimizing the SAR value, FIG. 15 shows the ground current of the typical IFA antenna working at the middle/high frequency when only the radiation structure 1 works (as shown in FIG. 15(*a*)), and shows the ground current at the middle/high frequency when the radiation structure 1 and the radiation structure 2 work together at the same time (as shown in FIG. 15(*b*)). Significantly, as shown in FIG. 15(*b*), the current has a larger distribution region on the ground. Correspondingly, as shown in FIG. 15(*a*), the current has a smaller distribution region on the ground. Therefore, when the radiation structure 1 and the radiation structure 2 work together at the same time, the current at the middle/high frequency is more dispersed, so that the SAR value at the middle/high frequency of the antenna system is smaller.

In combination with the description for FIG. 8 to FIG. 15, it can be seen that compared with the conventional IFA antenna, the antenna solution with the structure shown in FIG. 8 or FIG. 9 can obtain better radiation performance and lower SAR value in the upper antenna region without splitting the low frequency and the middle/high frequency.

It is to be noted that, in the description of FIG. 8 to FIG. 15, an example in which SW2 is disposed at an end of the radiation structure 2 away from the radiation structure 1 is used for description. In some other embodiments of this application, SW2 on the radiation structure 2 may be disposed at other positions to achieve the effect of switching the CM mode and the DM mode to cover the frequency band through different states of the SW2.

Figure 16:
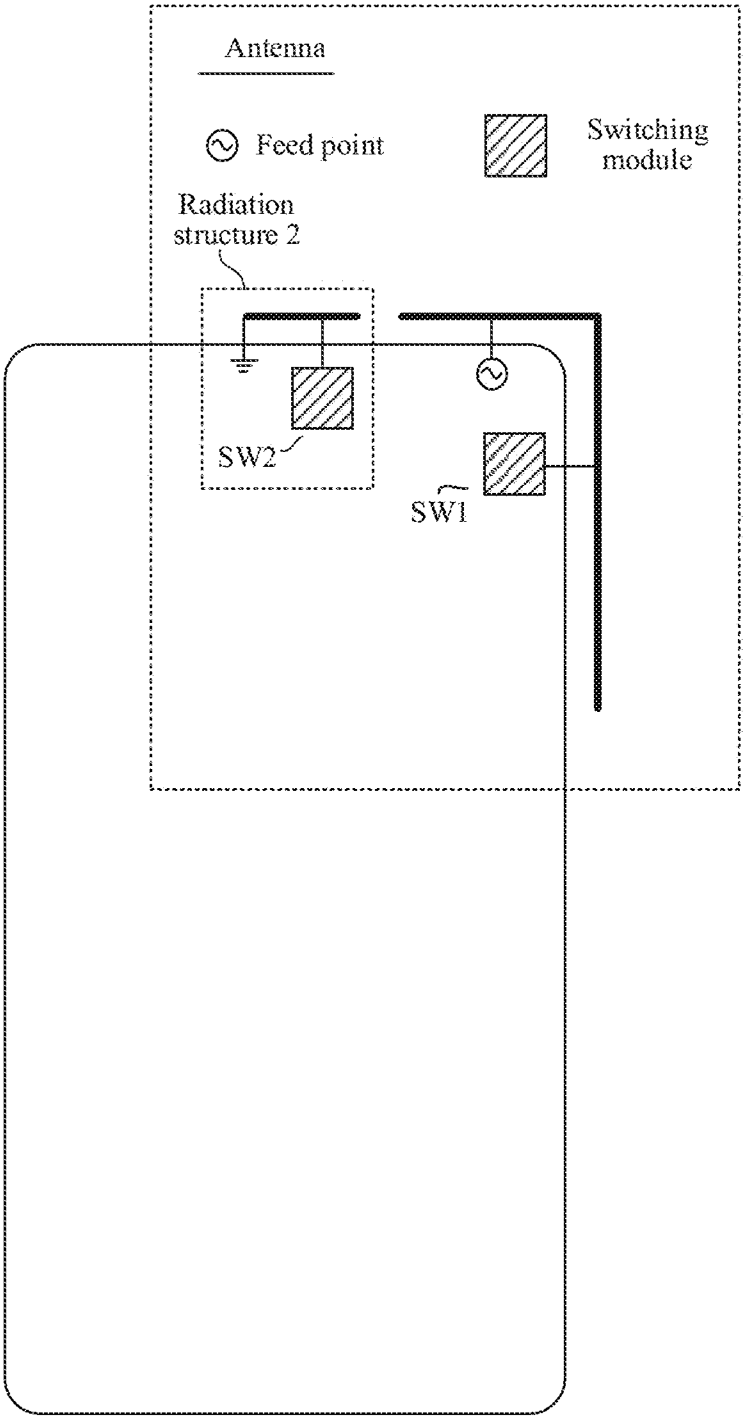
FIG. 16 is a schematic diagram of composition of an antenna according to an embodiment of this application.
Figure 17:
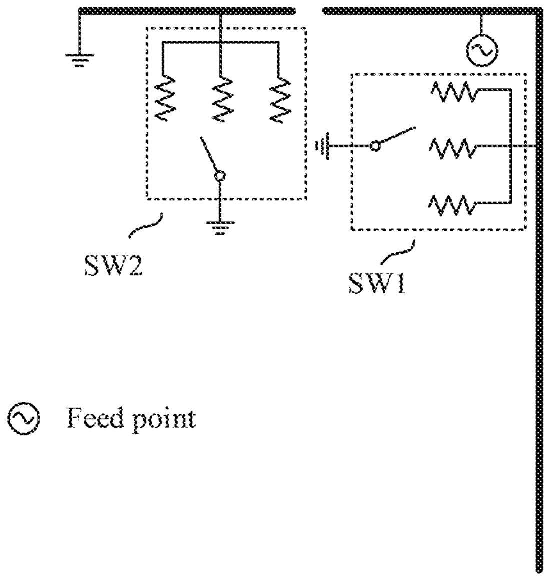
FIG. 17 is a schematic diagram of composition of an antenna according to an embodiment of this application.

As an example, FIG. 16 shows another SW2 arrangement. As shown in FIG. 16, SW2 may be disposed at an end of the radiation structure 2 close to the radiation structure 1. In this example, the radiator of the radiation structure 2 may return to the ground at an end away from the radiation structure 1 to effectively excite the CM mode and/or the DM mode. Corresponding to FIG. 16, FIG. 17 shows a specific composition of an antenna with a topological structure shown in FIG. 16. As shown in FIG. 17, the adjustment of the frequency band covered by the CM mode and/or the DM mode can be achieved by loading an inductor on different paths of SW2. For example, when a path 1 of SW2 is conducted, the CM mode and/or the DM mode may be adjusted to a frequency band 1; and when a path 2 of SW2 is conducted, the CM mode and/or the DM mode may be adjusted to a frequency band 2. When the inductance values of the path 1 and the path 2 are different, the frequency band 1 and the frequency band 2 are different.

Based on the above description of the antenna including the radiation structure 1 and the radiation structure 2, the CM mode and the DM mode can be used to cover the middle/high frequency to improve the radiation performance at the middle/high frequency and reduce the SAR value.

In some other embodiments of this application, in combination with the logical composition shown in FIG. 7, the antenna may also include a radiation structure 3. The radiation structure 3 can further optimize the radiation performance at the middle/high frequency.

With reference to FIG. 12 and FIG. 14, it can be seen that when the antenna with the composition shown in FIG. 8 or FIG. 9 works at the middle/high frequency, there will be pits between the CM mode and the DM mode due to the incompatibility of the two modes. The pits on S11 can be expressed as a bulge between the resonance corresponding to the CM mode and the resonance corresponding to the DM mode, and the pits on efficiency (including system efficiency and radiation efficiency) can be expressed as an efficiency sag between the resonance corresponding to the CM mode and the resonance corresponding to the DM mode. For example, FIG. 12 is used as an example. In the example of FIG. 12, the CM mode may be used to generate resonance around 2.6 GHz, which can be identified as a pit of resonance on S11. The DM mode may be used to generate resonance around 2.9 GHz, which can also be identified as a pit of resonance on S11. The S11 bulge caused by mode incompatibility is generated between the resonances of the CM mode and the DM mode around 2.75 GHz. Then there will be a corresponding reduction in efficiency around 2.75 GHz, which can be expressed as a sag on the efficiency curve.

In this example, the radiation structure 3 is added based on the radiation structure 1 and the radiation structure 2 to excite a new resonance between the CM mode and the DM mode, so as to compensate for the efficiency sag between the CM mode and the DM mode, and improve the middle/high-frequency radiation performance.

Figure 18:
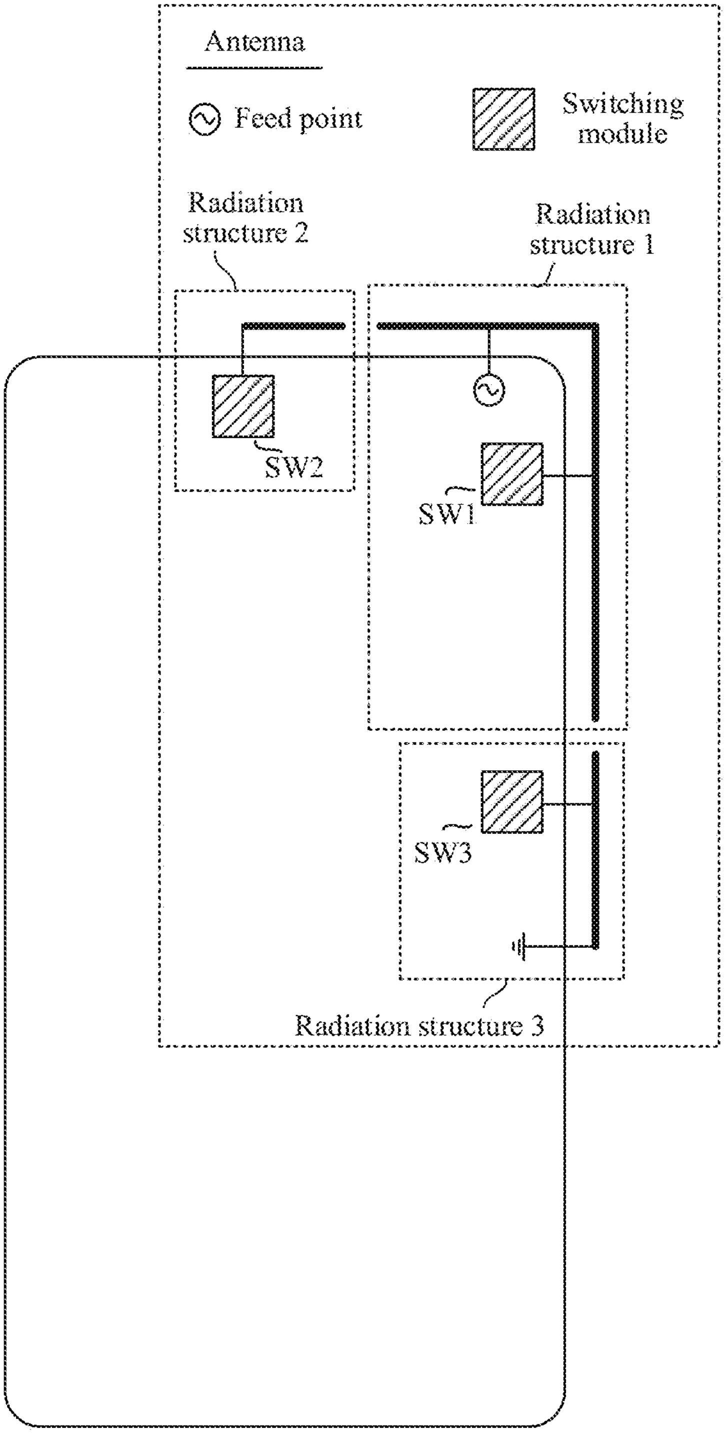
FIG. 18 is a schematic diagram of composition of an antenna according to an embodiment of this application.

For example, FIG. 18 is a schematic topology diagram of another antenna according to an embodiment of this application. Compared with the antenna shown in FIG. 8, in the example of FIG. 18, the antenna may also include a third radiation structure (such as a radiation structure 3).

The radiation structure 3 can be configured to excite a new resonance between the CM mode and the DM mode at the middle/high frequency, so as to improve the overall radiation performance at the middle/high frequency. In this example, the radiation structure 3 may include at least one radiator. An end of the radiator of the radiation structure 3 may be close to the radiator of the radiation structure 1, but the radiator of the radiation structure 3 is not connected to the radiator of the radiation structure 1. A gap may be formed between the radiator of the radiation structure 3 and the radiator of the radiation structure 1. When the radiation structure 1 is working, a changing current occurs on the radiator of the radiation structure 1. The energy can be coupled to the radiation structure 3 through the gap between the radiator of the radiation structure 3 and the radiator of the radiation structure 1, thereby exciting an alternating current on the radiator of the radiation structure 3.

In some embodiments, an end of the radiator of the radiation structure 3 away from the radiation structure 1 may be grounded, so that the radiation structure 3 forms a parasitic antenna for working. The size of the radiator of the radiation structure 3 may correspond to ¼ of the wavelength of the frequency band where the efficiency sag of the CM mode and the DM mode is located, so that the radiation structure 3 can generate a new resonance in the frequency band where the efficiency sag of the CM mode and the DM mode is located through the parasitic effect. In some implementations, as shown in FIG. 18, a switching module SW3 may be disposed at an end of the radiation structure 3 close to the radiation structure 1. The SW3 may be configured to switch different paths to make the radiator of the radiation structure 3 present different electrical lengths, so that the radiation structure 3 can adjust the resonance position corresponding to the parasitic according to the needs of different scenarios, and more effectively compensate the efficiency sag at the middle/high frequency. Certainly, in some embodiments, the SW3 may not be disposed in the radiation structure 3, so as to achieve the effect of compensating for the radiation performance at the middle/high frequency and reducing the device cost and the layout space.

Figure 19:
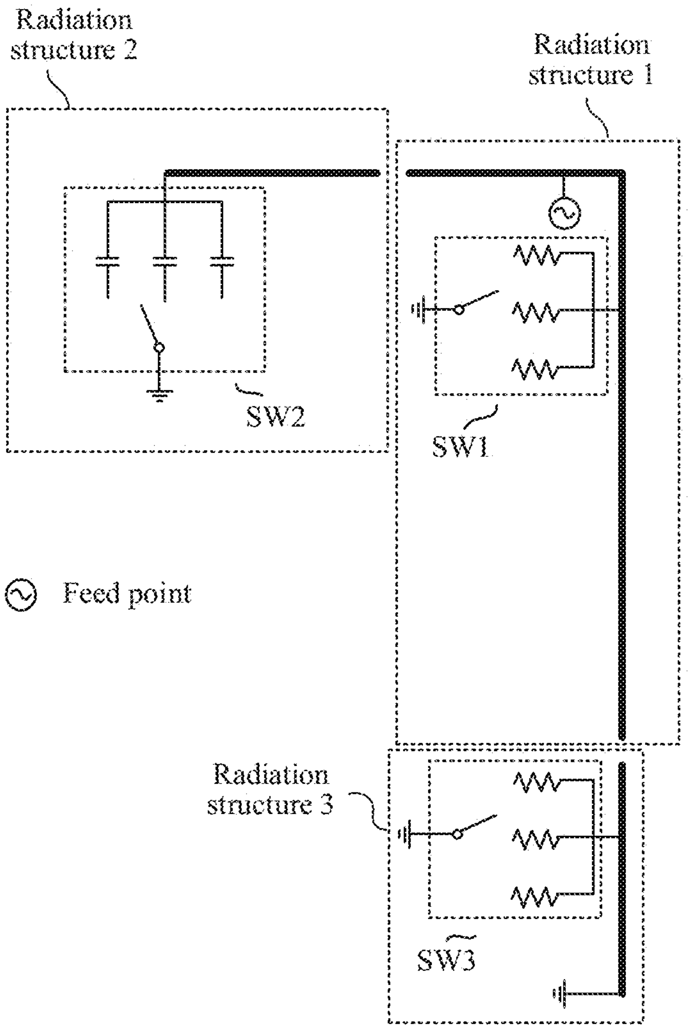
FIG. 19 is a schematic diagram of composition of an antenna according to an embodiment of this application.

To more clearly describe the antenna shown in FIG. 18, FIG. 19 shows a specific implementation of an antenna with a topological structure shown in FIG. 18. For the implementation of the radiation structure 1 and the radiation structure 2, reference may be made to the description in FIG. 9, and details are not described herein again.

In the example of FIG. 19, the composition of the radiator of the radiation structure 3 is similar to the radiator of the radiation structure 1 and the radiation structure 2 above, and its radiation function may be implemented by FPC, LDS, stamping, or a metal structural member in the mobile phone. In the radiation structure 3, the SW3 can implement its switching function through the SPNT or a plurality of switching switches in the above example, or other components with the switching function. For example, as shown in FIG. 19, the SW3 may implement the switching function by SP3T. Inductors may be loaded on different paths of the SP3T, so that the effect of adjusting the electrical length of the parasitic stub can be achieved by switching different paths.

For example, when a path A of the SW3 is conducted, the resonance generated by the radiation structure 3 may be located in a frequency band A; and when a path B of the SW3 is conducted, the resonance generated by the radiation structure 3 may be located in a frequency band B. When the inductance values loaded on the path A and the path B are different, the frequency band A and the frequency band B are different. As an example, in a case that the inductance A of the path A is greater than the inductance B of the path B, the resonance generated by the radiation structure 3 may move from the lower frequency band (that is, frequency band A) to the higher frequency band (that is, frequency band B) when the SW3 is switched from the path A to the path B.

In the embodiments of this application, after the radiation structure 3 is added, the resonance at the middle/high frequency can be significantly improved, and the efficiency sag at the middle/high frequency caused by the introduction of the CM mode and the DM mode can be weakened. The radiation performance of the antenna after adding the radiation structure 2 and the radiation structure 3 will be described in detail below with reference to the simulation results.

For ease of description, the distribution of the S-parameters of the typical IFA mode when only the radiation structure 1 is working is also shown in the figures.

Figure 20:
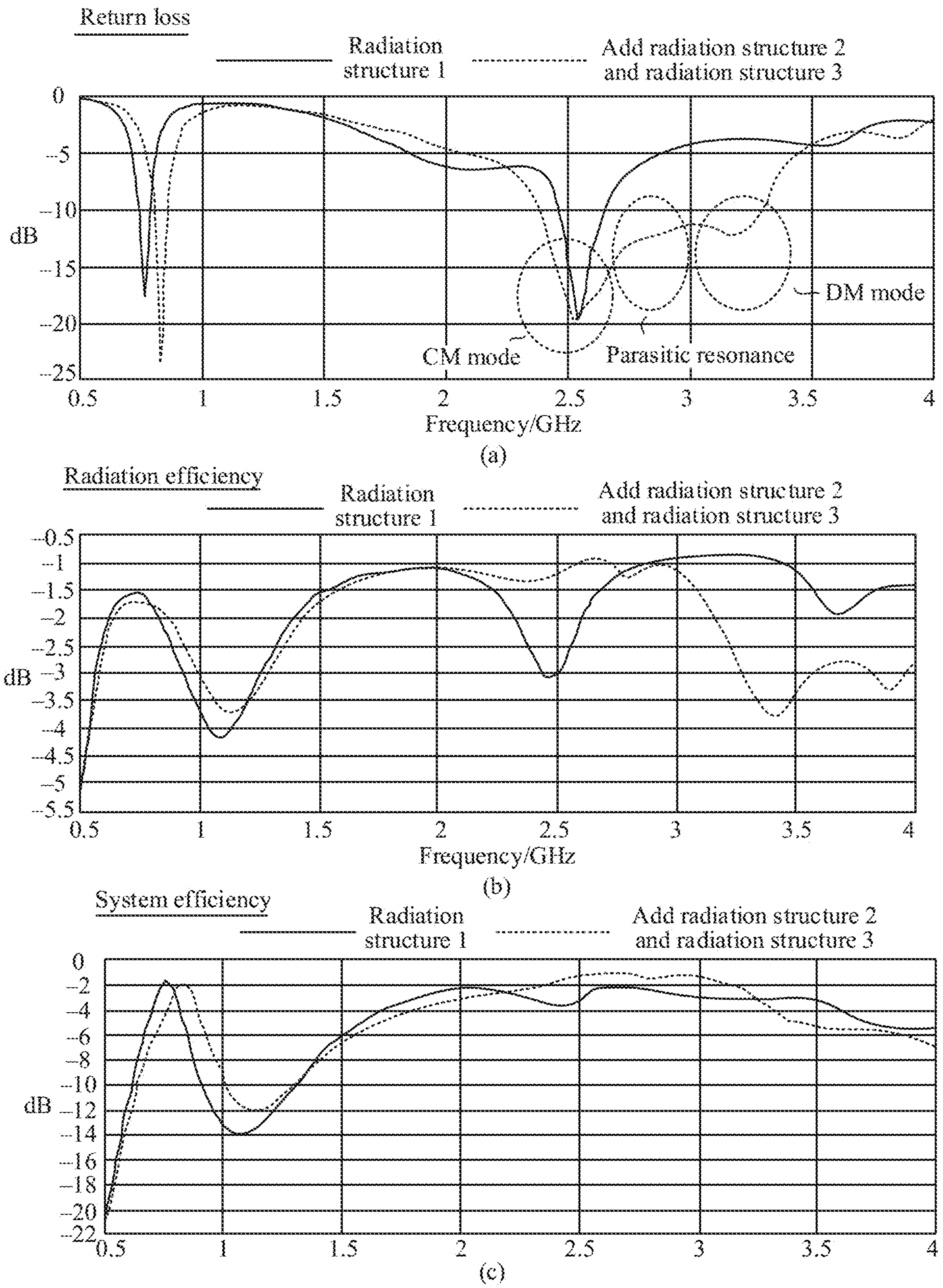
FIG. 20 is a schematic diagram of S-parameters of an antenna according to an embodiment of this application.

FIG. 20 shows the distribution of S-parameters of the antenna with the composition shown in FIG. 19 according to an embodiment of this application. As shown in FIG. 20(*a*), after the radiation structure 2 and the radiation structure 3 are added, a parasitic resonance appears between the CM mode and the DM mode on S11. In combination with the S11 after only the radiation structure 2 is added as shown in FIG. 12, after the radiation structure 3 is added, due to the appearance of parasitic resonance, the bulge between the resonances of the CM mode and the DM mode is compensated, and the highest point is about −11 dB as shown in FIG. 12 and then drops to about −13 dB as shown in FIG. 12.

Further referring to FIG. 20(*b*), after the radiation structure 3 is added, the radiation efficiency of the antenna at the middle/high frequency is significantly increased. In addition, as shown in FIG. 20(*c*), after the radiation structure 3 is added, the actual efficiency of the antenna at the middle/high frequency is also significantly increased. As a result, compared with a typical IFA antenna, the addition of the radiation structure 2 and the radiation structure 3 can provide better radiation performance at the middle/high frequency. Compared with the efficiency after the radiation structure 2 is added as shown in FIG. 14, it can be seen that after the radiation structure 3 is added, the effect of compensating the middle/high-frequency performance can be achieved.

The following shows that the SAR value of the antenna with the composition shown in FIG. 19 can be lower by comparing the distribution of the current on the ground after the radiation structure 2 and the radiation structure 3 are added.

Figure 21:
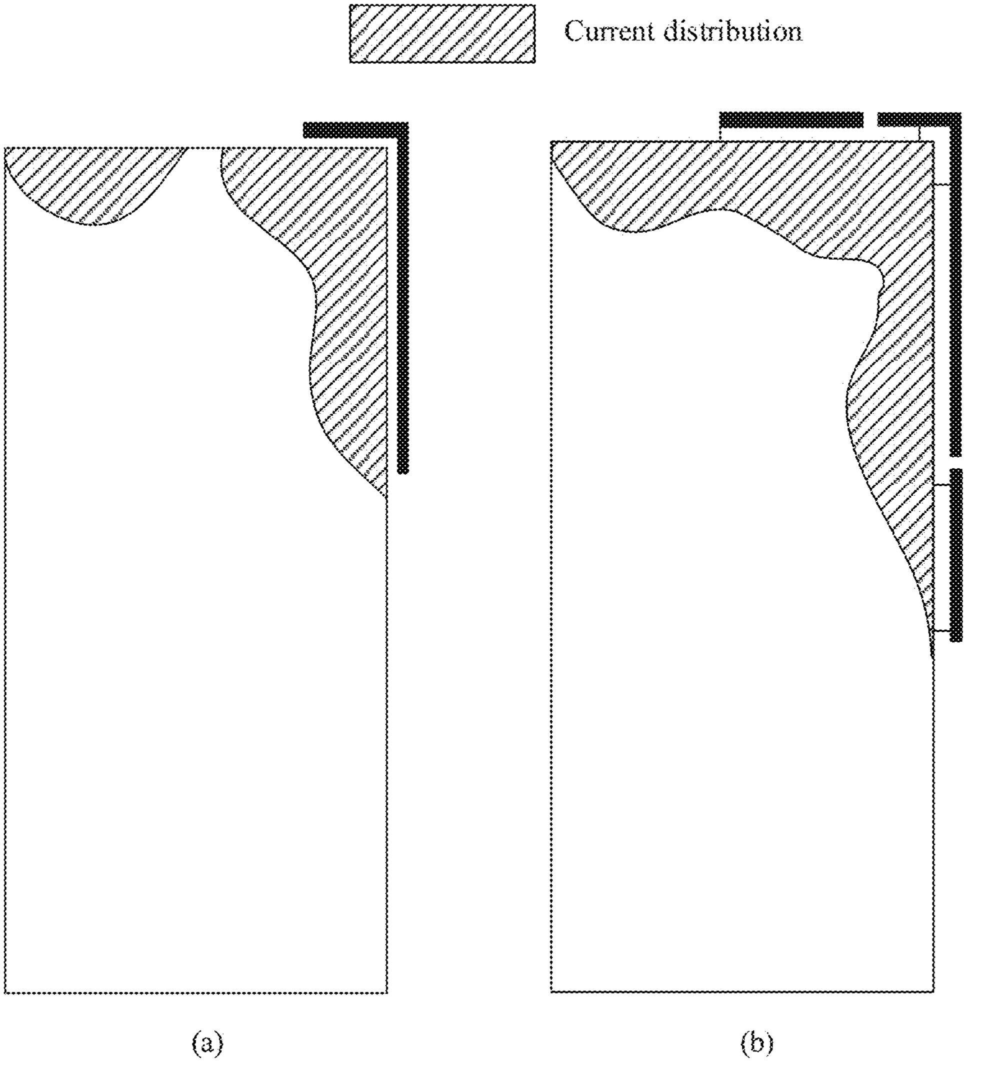
FIG. 21 is a schematic diagram of current distribution according to an embodiment of this application.

FIG. 21(*a*) shows the distribution of the ground current when only the radiation structure 1 is working. Compared with the radiation structure 1 shown in FIG. 21(*b*), when the radiation structure 2 and the radiation structure 3 work together at the same time, it can be clearly seen that the ground current distribution is expanded after the radiation structure 2 and the radiation structure 3 are added. As a result, when the antenna with the composition shown in FIG. 19 radiates, its energy distribution is more dispersed, so that it can have a lower SAR value than a typical IFA.

Figure 22:
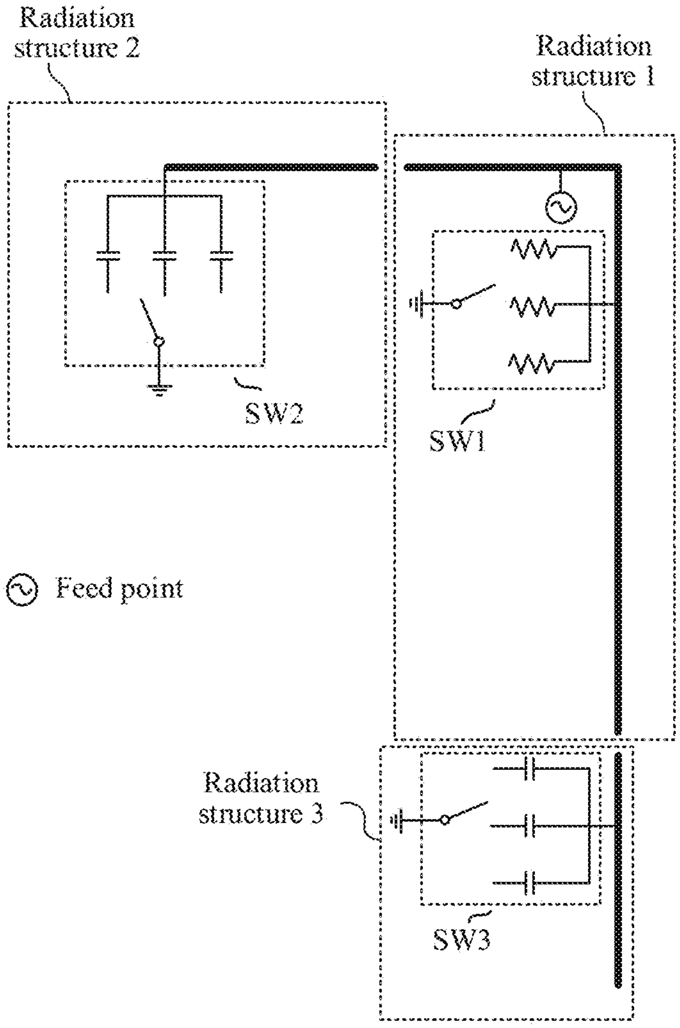
FIG. 22 is a schematic diagram of composition of an antenna according to an embodiment of this application.

It is to be noted that, FIG. 18 and FIG. 19 are merely examples of the radiation structure 3 according to the embodiments of this application. In some other embodiments of this application, the radiation structure 3 may also have other compositions, so as to achieve the effect of compensating the CM mode and the DM mode through the parasitic effect. For example, in some embodiments, referring to FIG. 22, an end of the radiator of the radiation structure 3 away from the radiation structure 1 may not be grounded (free). Correspondingly, each path of SW3 may be loaded with a capacitor, so that when SW3 is switched to different paths, the capacitors on different paths may be loaded on the radiator of the radiation structure 3. In this way, while the parasitic resonance of the radiation structure 3 is excited, the resonance position is adjusted through the capacitors on different paths.

In the description of FIG. 18 to FIG. 22, an example in which SW3 is disposed at an end of the radiation structure 3 close to the radiation structure 1 is used for description. In some other embodiments of this application, SW3 may be disposed at other positions in the radiation structure 3, which can also have the effect of adjusting the frequency band corresponding to the parasitic resonance of the radiation structure 3. A specific position of SW3 in the radiation structure 3 is not limited in the embodiments of this application.

From the above description, it is to be understood that the antenna solution provided in the embodiments of this application has better radiation performance than a typical IFA antenna, and can avoid an excessively high SAR value at the middle/high frequency caused by the higher-order mode of IFA.

For example, the above effect will be described below according to the results of SAR actual measurement on a typical IFA antenna and an antenna with the composition shown in FIG. 19.

1. Comparison of Body SAR measurement results of different antennas at middle/high frequency under CE 5 mm 10 g.

Figure 23:
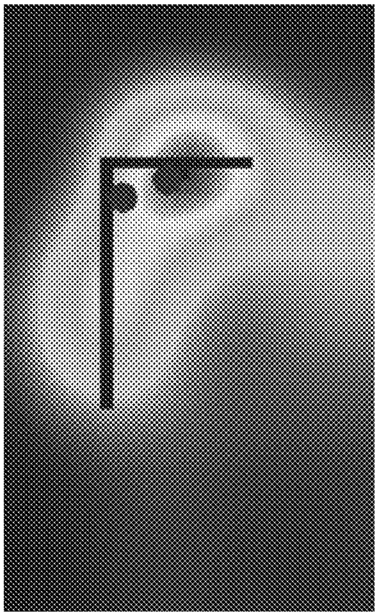
FIG. 23 is a schematic diagram of distribution of body SAR hot spots according to an embodiment of this application.
Figure 23:
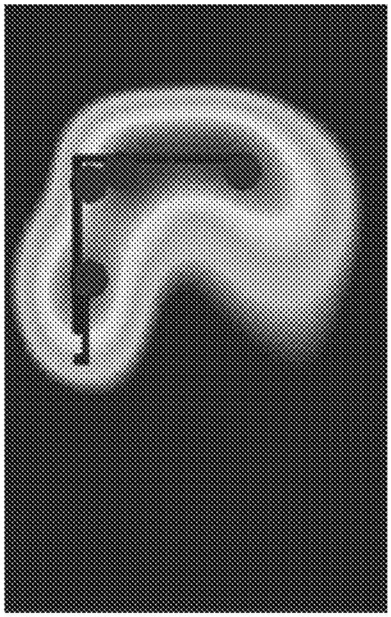

FIG. 23 shows distribution of hot spots of a typical IFA antenna and an antenna with the composition shown in FIG. 19 during measurement. FIG. 23(*a*) shows distribution of hot spots of the typical IFA antenna. FIG. 23(*b*) shows distribution of hot spots of the antenna provided in this application. Obviously, the distribution of hot spots shown in FIG. 23(*b*) is more dispersed, so the SAR value is lower.

TABLE 2

| Body SAR (5 mm) | | Typical | |
|---|---|---|---|
| Frequency point (GHz) | Input power (dBm) | IFA antenna | The present invention |
| 2.00 | 24 | 1.30 | 0.93 |
| 2.40 | 24 | 2.81 | 1.69 |
| 2.48 | 24 | 2.05 | 1.35 |
| 2.52 | 24 | 1.65 | 1.10 |
| 2.56 | 24 | 1.36 | 0.92 |
| 2.60 | 24 | 1.14 | 0.90 |

It can be seen that the SAR value of the antenna with the composition shown in FIG. 19 provided in the embodiments of this application is smaller than that of the typical IFA antenna in the full frequency band of 2-2.6 GHz.

2. Comparison of Body SAR measurement results of different antennas at middle/high frequency under CE 0 mm 10 g.

Figure 24:
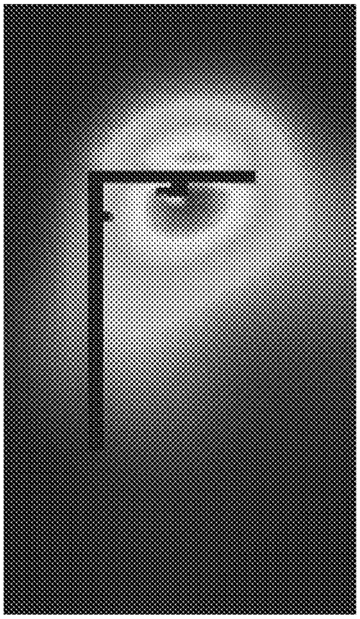
FIG. 24 is a schematic diagram of distribution of body SAR hot spots according to an embodiment of this application.
Figure 24:
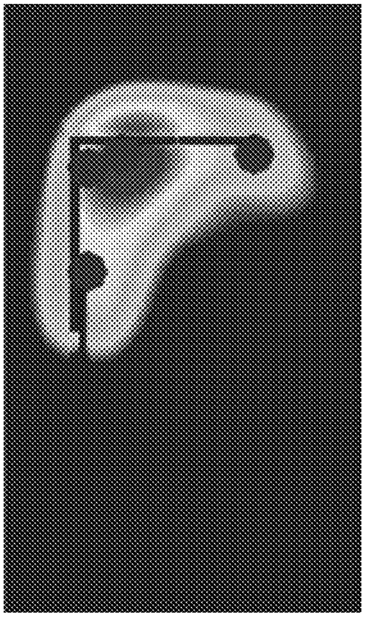

FIG. 24 shows distribution of hot spots of a typical IFA antenna and an antenna with the composition shown in FIG. 19 during measurement. FIG. 24(*a*) shows distribution of hot spots of the typical IFA antenna. FIG. 24(*b*) shows distribution of hot spots of the antenna provided in this application. Obviously, the distribution of hot spots shown in FIG. 24(*b*) is more dispersed, so the SAR value is lower.

Table 3 shows the SAR measurement results of the two antennas.

TABLE 3

| Body SAR (0 mm) | | Typical | |
|---|---|---|---|
| Frequency point (GHz) | Input power (dBm) | IFA antenna | The present invention |
| 2.00 | 24 | 3.97 | 2.93 |
| 2.40 | 24 | 7.70 | 2.98 |
| 2.48 | 24 | 6.03 | 2.58 |
| 2.52 | 24 | 5.25 | 2.49 |
| 2.56 | 24 | 4.78 | 2.45 |
| 2.60 | 24 | 4.41 | 2.47 |

It can be seen that the SAR value of the antenna with the composition shown in FIG. 19 provided in the embodiments of this application is smaller than that of the typical IFA antenna in the full frequency band of 2-2.6 GHz.

3. Comparison of Head SAR measurement results of different antennas at middle/high frequency.

Figure 25:
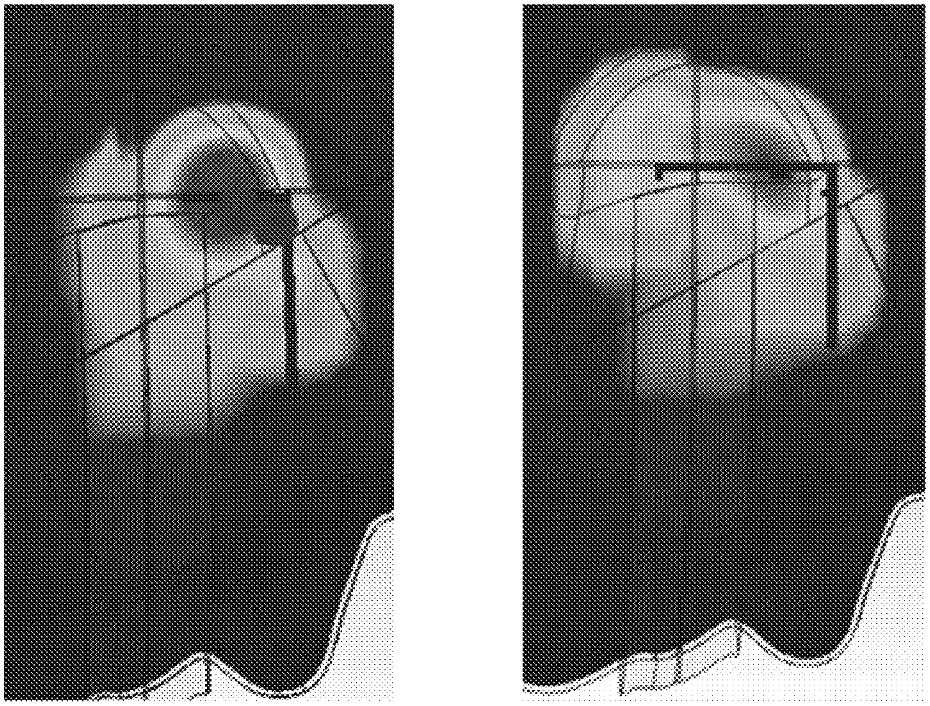
FIG. 25 is a schematic diagram of distribution of Head SAR hot spots according to an embodiment of this application.

FIG. 25 shows distribution of hot spots of a typical IFA antenna and an antenna with the composition shown in FIG. 19 during measurement. FIG. 25(*a*) shows distribution of hot spots of the typical IFA antenna. FIG. 25(*b*) shows distribution of hot spots of the antenna provided in this application. Obviously, the distribution of hot spots shown in FIG. 25(*b*) is more dispersed, so the SAR value is lower.

Table 4 shows the SAR measurement results of the two antennas.

TABLE 4

| Body SAR (0 mm) | | | | | | | | | |
|---|---|---|---|---|---|---|---|---|---|
| Frequency | Input | Typical IFA antenna | | | | The present invention | | | |
| point | power | Right Head | | Right Head | | Right Head | | Right Head | |
| (GHz) | (dBm) | 1 g | 10 g | 1 g | 10 g | 1 g | 10 g | 1 g | 10 g |
| 2.00 | 24 | 1.22 | 0.62 | 0.72 | 0.44 | 0.94 | 0.48 | 0.56 | 0.33 |
| 2.40 | 24 | 1.84 | 0.76 | 0.77 | 0.35 | 1.47 | 0.61 | 0.64 | 0.3 |
| 2.48 | 24 | 1.65 | 0.68 | 0.81 | 0.36 | 1.21 | 0.49 | 0.62 | 0.26 |
| 2.52 | 24 | 1.56 | 0.64 | 0.82 | 0.36 | 1.09 | 0.44 | 0.65 | 0.26 |
| 2.56 | 24 | 1.52 | 0.63 | 0.83 | 0.37 | 1.02 | 0.41 | 0.67 | 0.26 |
| 2.60 | 24 | 1.49 | 0.61 | 0.84 | 0.37 | 0.98 | 0.4 | 0.67 | 0.26 |

It can be seen that the SAR value of the antenna with the composition shown in FIG. 19 provided in the embodiments of this application is smaller than that of the typical IFA antenna in the full frequency band of 2-2.6 GHz.

All or some of the functions or motions or operations or steps in the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on a computer, the procedures or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (solid state disk, SSD)), or the like.

Although this application is described with reference to specific features and the embodiments thereof, apparently, various modifications and combinations may be made to them without departing from the spirit and scope of this application. Correspondingly, this specification and the accompanying drawings are merely used as exemplary descriptions of this application defined by the appended claims, and are considered as having covered any of and all of modifications, variations, combinations, or equivalents within the scope of this application. Obviously, a person skilled in the art may make various modifications and variations to this application without departing from the spirit and scope of this application. If these modifications and variations of this application fall within the scope of the claims of this application and equivalent technologies thereof, this application is intended to include these modifications and variations.

The invention claimed is:

1. An antenna for an electronic device, the antenna comprising:

a first radiation structure comprising a first radiator having a first end and a second end, wherein the second end of the first radiator is suspended in air;

a second radiation structure comprising a second radiator having a first end and a second end, wherein the first end of the second radiator is provided opposite to the first end of the first radiator, wherein the first end of the second radiator forms a first gap with the first end of the first radiator, wherein the second end of the second radiator is grounded, and wherein the first radiator is not electrically connected to the second radiator and is coupled to the second radiator through the first gap to excite a current on the second radiator;

a feed point coupled to the first radiator, wherein the first radiator is divided into a first portion and a second portion that are delimited by the feed point, and wherein a length of the first portion is less than a length of the second portion; and a ground point provided on the second portion between the second end of the first radiator and the feed point, wherein the feed point coupled to the first radiator is located proximate to a bend of the first radiator, wherein the second radiation structure forms a parasitic structure of the first radiator, wherein the first portion of the first radiator and the second radiator are configured to work together in a first frequency band and a second frequency band during operation, wherein a frequency of the first frequency band is less than a frequency of the second frequency band, wherein in a case of working in the first frequency band, a current direction of the first portion is the same as a current direction of the second radiator, and wherein in a case of working in the second frequency band, the current direction of the first portion is opposite to the current direction of the second radiator at the first gap.

2. The antenna of claim 1, wherein the first radiation structure is an inverted-F antenna (IFA).

3. The antenna of claim 1, wherein in a case that the antenna is in operation, a slot common mode is excited on the first portion of the first radiator and the second radiator to cover the first frequency band, and wherein a slot differential mode is excited on the first portion of the first radiator and the second radiator to cover the second frequency band.

4. The antenna of claim 1, wherein a working frequency band of the second portion of the first radiator covers a third frequency band, and a frequency of the third frequency band is less than the frequency of the second frequency band, and wherein in a case that the antenna works in the third frequency band, the current direction of the first portion is the same as the current direction of the second radiator, and the first radiator covers the third frequency band by exciting a left-hand mode.

5. The antenna of claim 1, further comprising a third radiation structure comprising a third radiator having a first end and a second end, wherein the third radiator is not electrically connected to the first radiator and the second radiator respectively, wherein the first end of the third radiator and the second end of the first radiator are provided opposite to each other, wherein the first end of the third radiator forms a second gap with the second end of the first radiator, and wherein a ground point is provided on the third radiator.

6. The antenna of claim 5, wherein the third radiation structure forms a parasitic structure of the first radiator.

7. The antenna of claim 5, wherein a working frequency band of the third radiator covers a fourth frequency band, and a frequency of the fourth frequency band is between the frequency of the first frequency band and the frequency of the second frequency band.

8. The antenna of claim 4, wherein the first frequency band comprises [2300, 2500] MHz, the second frequency band comprises [2500, 2700] MHz, and the third frequency band comprises [700, 960] MHz.

9. An electronic device, comprising:

a processor;

a radio frequency module coupled to the processor; and an antenna coupled to the radio frequency module, the antenna comprising:

a first radiation structure comprising a first radiator having a first end and a second end, wherein the second end of the first radiator is suspended in air;

a second radiation structure comprising a second radiator having a first end and a second end, wherein the first end of the second radiator is provided opposite to the first end of the first radiator, wherein the first end of the second radiator forms a first gap with the first end of the first radiator, wherein the second end of the second radiator is grounded;

a feed point coupled to the first radiator, wherein the first radiator is divided into a first portion and a second portion that are delimited by the feed point, and wherein a length of the first portion is less than a length of the second portion; and a ground point provided on the second portion between the second end of the first radiator and the feed point, wherein the processor is configured to cause the electronic device to send or receive signals through the radio frequency module and the antenna, wherein the feed point coupled to the first radiator is located proximate to a bend of the first radiator, wherein the second radiation structure forms a parasitic structure of the first radiator, wherein the first portion of the first radiator and the second radiator are configured to work together in a first frequency band and a second frequency band during operation, wherein a frequency of the first frequency band is less than a frequency of the second frequency band, wherein in a case of working in the first frequency band, a current direction of the first portion is the same as a current direction of the second radiator, and wherein in a case of working in the second frequency band, the current direction of the first portion is opposite to the current direction of the second radiator at the first gap.

10. The electronic device of claim 9, wherein the first radiation structure is an inverted-F antenna (IFA).

11. The electronic device of claim 9, wherein in a case that the antenna is in operation, a slot common mode is excited on the first portion of the first radiator and the second radiator to cover the first frequency band, and wherein a slot differential mode is excited on the first portion of the first radiator and the second radiator to cover the second frequency band.

12. The electronic device of claim 9, wherein a working frequency band of the second portion of the first radiator covers a third frequency band, and a frequency of the third frequency band is less than the frequency of the second frequency band, and wherein in a case that the antenna works in the third frequency band, the current direction of the first portion is the same as the current direction of the second radiator, and the first radiator covers the third frequency band by exciting a left-hand mode.

13. The electronic device of claim 9, wherein the antenna further comprises a third radiation structure, the third radiation structure comprising a third radiator having a first end and a second end, wherein the third radiator is not electrically connected to the first radiator and the second radiator respectively, wherein the first end of the third radiator and the second end of the first radiator are provided opposite to each other, wherein the first end of the third radiator forms a second gap with the second end of the first radiator, and wherein a ground point is provided on the third radiator.

14. The electronic device of claim 13, wherein the third radiation structure forms a parasitic structure of the first radiator.

15. The electronic device of claim 9, wherein the second portion of the first radiator is disposed along a side of the electronic device, and the first portion of the first radiator is disposed along a top of the electronic device.

16. The electronic device of claim 9, wherein the first radiation structure further comprises a first switching module coupled between the first radiator and the ground point, and wherein the second radiation structure further comprises a second switching module coupled between the second radiator and a second ground point.

17. The antenna of claim 1, wherein the second portion of the first radiator is disposed along a side of the electronic device, and the first portion of the first radiator is disposed along a top of the electronic device.

18. The antenna of claim 1, wherein the first radiation structure further comprises a first switching module coupled between the first radiator and the ground point, and wherein the second radiation structure further comprises a second switching module coupled between the second radiator and a second ground point.

19. The antenna of claim 1, wherein the feed point is configured to be located in an upper corner of the electronic device.

20. The electronic device of claim 9, wherein the feed point is located in an upper corner of the electronic device.

* * * * *